US012596029B2

(12) United States Patent
Gibson et al.

(10) Patent No.: US 12,596,029 B2
(45) Date of Patent: Apr. 7, 2026

(54) ACOUSTIC SENSOR SYSTEM

(71) Applicant: Mueller International, LLC, Atlanta, GA (US)

(72) Inventors: Daryl Lee Gibson, Cleveland, TN (US); Mohammad Hassan Sobhani, Burlington (CA); Andrew Wallace, Richmond Hill (CA); Yongjun Mao, Markham (CA); Valentin Mircea Burtea, Toronto (CA); Pocholo Laforteza, Oakville (CA); Sebastien Perrier, Peterbrough (CA); Bruce Robertson, Toronto (CA); Igor Gorban, Oakville (CA); Marcin Paul Kloc, Oakville (CA)

(73) Assignee: Mueller International, LLC, Atlanta, GA (US)

( * ) Notice: Subject to any disclaimer, the term of this patent is extended or adjusted under 35 U.S.C. 154(b) by 677 days.

(21) Appl. No.: 17/949,383

(22) Filed: Sep. 21, 2022

(65) Prior Publication Data

US 2023/0091331 A1 Mar. 23, 2023

Related U.S. Application Data

(60) Provisional application No. 63/392,245, filed on Jul. 26, 2022, provisional application No. 63/246,857, filed on Sep. 22, 2021.

(51) Int. Cl.
*G01M 3/24* (2006.01)
*G01H 11/08* (2006.01)

(52) U.S. Cl.
CPC ............ *G01H 11/08* (2013.01); *G01M 3/243* (2013.01)

(58) Field of Classification Search
None
See application file for complete search history.

(56) References Cited

U.S. PATENT DOCUMENTS

| | | | |
|---|---|---|---|
| 2016/0047706 A1* | 2/2016 | Maruta | G01H 17/00 73/49.1 |
| 2019/0250062 A1* | 8/2019 | Furuichi | G01H 3/06 |
| 2020/0232863 A1* | 7/2020 | Moreno | G01L 19/141 |

* cited by examiner

*Primary Examiner* — Suman K Nath
(74) *Attorney, Agent, or Firm* — Taylor Duma LLP

(57) ABSTRACT

A sensor system can include a sensor module including a vibration sensor; a processor module including a power supply and a processor PCB, the processor module connected in electrical communication with the sensor module by a first cable; and an antenna module including an antenna, the antenna module connected in electrical communication with the processor module by a second cable.

9 Claims, 27 Drawing Sheets

ACOUSTIC SENSOR SYSTEM

CROSS-REFERENCE TO RELATED APPLICATIONS

This application claims the benefit of U.S. Provisional Application No. 63/392,245, filed on Jul. 26, 2022, and U.S. Provisional Application No. 63/246,857, filed on Sep. 22, 2021, which are each hereby incorporated by reference in their entirety.

TECHNICAL FIELD

This disclosure relates to an acoustic sensor. More specifically, this disclosure relates to an acoustic sensor system for monitoring a pipe network.

BACKGROUND

Many existing pipe networks, such as utility water and gas lines, oil and gas transmission lines, and other infrastructure lines, have been in service well beyond their originally designed service life, which can lead to leaks from corrosion, fatigue, and other phenomena that degrade the structural integrity of the pipe networks and their components. Newer pipe networks may also experience leaks, such as from faulty materials or workmanship, seismic activity, freeze-thaw cycling, or unexpectedly corrosive conditions. Many pipe networks primarily run below ground, and leaks cannot be discovered by visual inspection. Leaks in pipe networks can create vibrations within the pipe networks and their components, which can be detected with acoustic sensors.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

Discloses is a sensor system comprising a sensor module comprising a vibration sensor; a processor module comprising a power supply and a processor PCB, the processor module connected in electrical communication with the sensor module by a first cable; and an antenna module comprising an antenna, the antenna module connected in electrical communication with the processor module by a second cable.

Also disclosed is a sensor system comprising: a lid; a mounting bracket coupled to the lid; and an antenna module coupled to the mounting bracket.

Also disclosed is a sensor module comprising: an enclosure comprising: a first shell defining a cable opening; and a second shell forming a tongue-and-groove interface with the first shell, the second shell defining a sensor cavity and a bottom end positioned opposite from the first shell; a cable extending through the cable opening and into the sensor cavity; a vibration sensor coupled in electrical communication with the cable, the vibration sensor defining a threaded portion, the threaded portion coupled to the bottom end; and a magnet secured to the bottom end by the vibration sensor, the threaded portion extending through an aperture defined by the magnet.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The features and components of the following figures are illustrated to emphasize the general principles of the present disclosure. The drawings are not necessarily drawn to scale. Corresponding features and components throughout the figures may be designated by matching reference characters for the sake of consistency and clarity.

DETAILED DESCRIPTION

Figure 1:
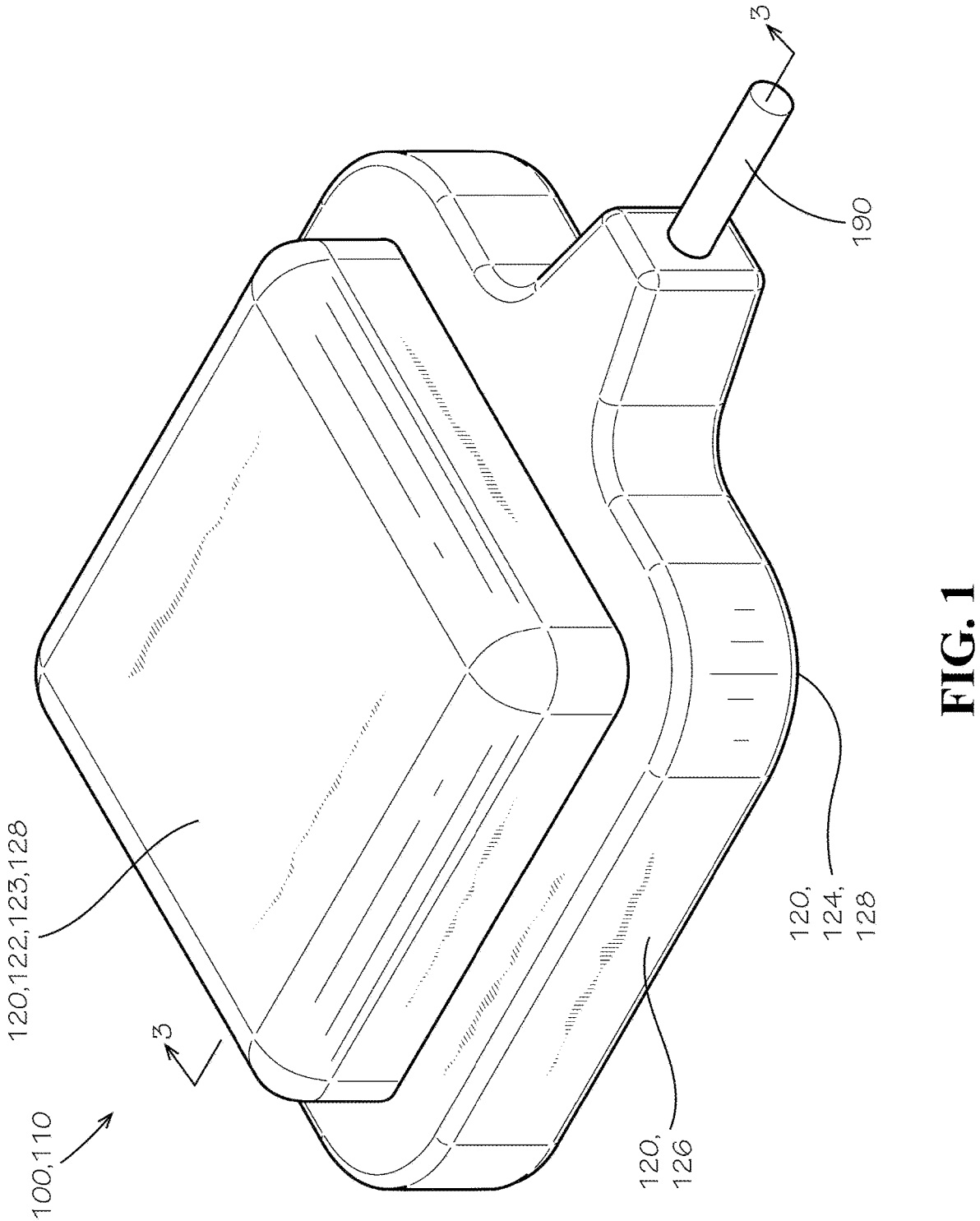
FIG. 1 is a top perspective view of a sensor module of a sensor system in accordance with one aspect of the present disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed, that while specific reference of each various individual and collective combinations and permutations of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is a sensor system and associated methods, systems, devices, and various apparatus. The sensor system can comprise a sensor module, a processor module, and an antenna module. It would be understood by one of skill in the art that the disclosed sensor system is described in but a few exemplary aspects among many. No particular terminology or description should be considered limiting on the disclosure or the scope of any claims issuing therefrom.

FIG. 1 is a top perspective view of a sensor module 110 of a sensor system 100 in accordance with one aspect of the present disclosure. The sensor module 110 can comprise a sensor enclosure 120 and a cable 190. The sensor enclosure 120 can be hermetically sealed, and the sensor module 110 can be configured to be fully submerged, such as for underwater applications for example and without limitation.

In the present view, the cable 190 is represented by a short length, which should not be viewed as limiting. The cable 190 can be any suitable length. The sensor enclosure 120 can comprise a first shell 122, a second shell 124, and an over-molded portion 126. In the present viewing angle, only a small portion of the second shell 124 is shown protruding below the over-molded portion 126. The first shell 122 and the second shell 124, together, can be a sensor enclosure shell 128 of the sensor enclosure 120. The first shell 122 can define a top surface 123, with respect to the present viewing angle. In the present aspect, the top surface 123 can be substantially planar. In some aspects, the top surface 123 can be curved, such as being convex for example and without limitation. The top surface 123 can be rectangular, such as square for example and without limitation, or any other suitable shape.

The over-molded portion 126 can extend around a perimeter of the first shell 122 and the second shell 124. Specifically, the over-molded portion 126 can extend around a joint, or seam, 330 (shown in FIG. 3) of the sensor enclosure shell 128, whereat the first shell 122 and the second shell 124 can meet.

Figure 3:
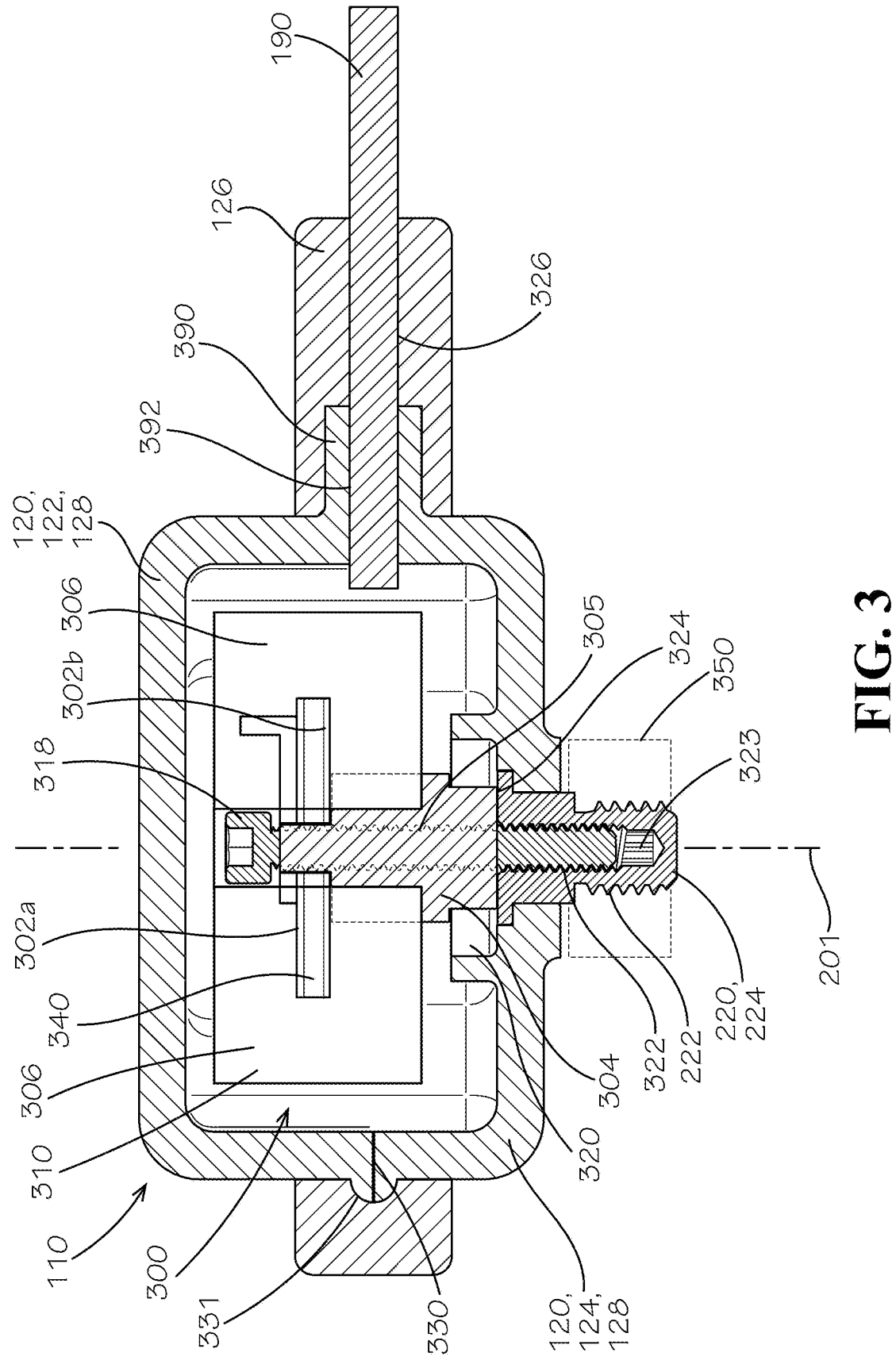
FIG. 3 is a cross-sectional view of the sensor module of FIG. 1 taken along line 3-3 shown in FIG. 1.

The sensor enclosure 120 can define a sensor cavity 300 (shown in FIG. 3). The cable 190 can extend through the sensor enclosure 120 to the sensor cavity 300. In the present aspect, the cable 190 can extend through the over-molded portion 126. As described in greater detail with respect to FIGS. 3 and 4, the cable 190 can extend between the first shell 122 and the second shell 124 at the joint 330.

The sensor enclosure shell 128 and the over-molded portion 126 can comprise one or more polymeric or composite materials. In some aspects, either or both of the sensor enclosure shell 128 and the over-molded portion 126 can comprise a different material, such as a metal for example and without limitation.

Figure 2:
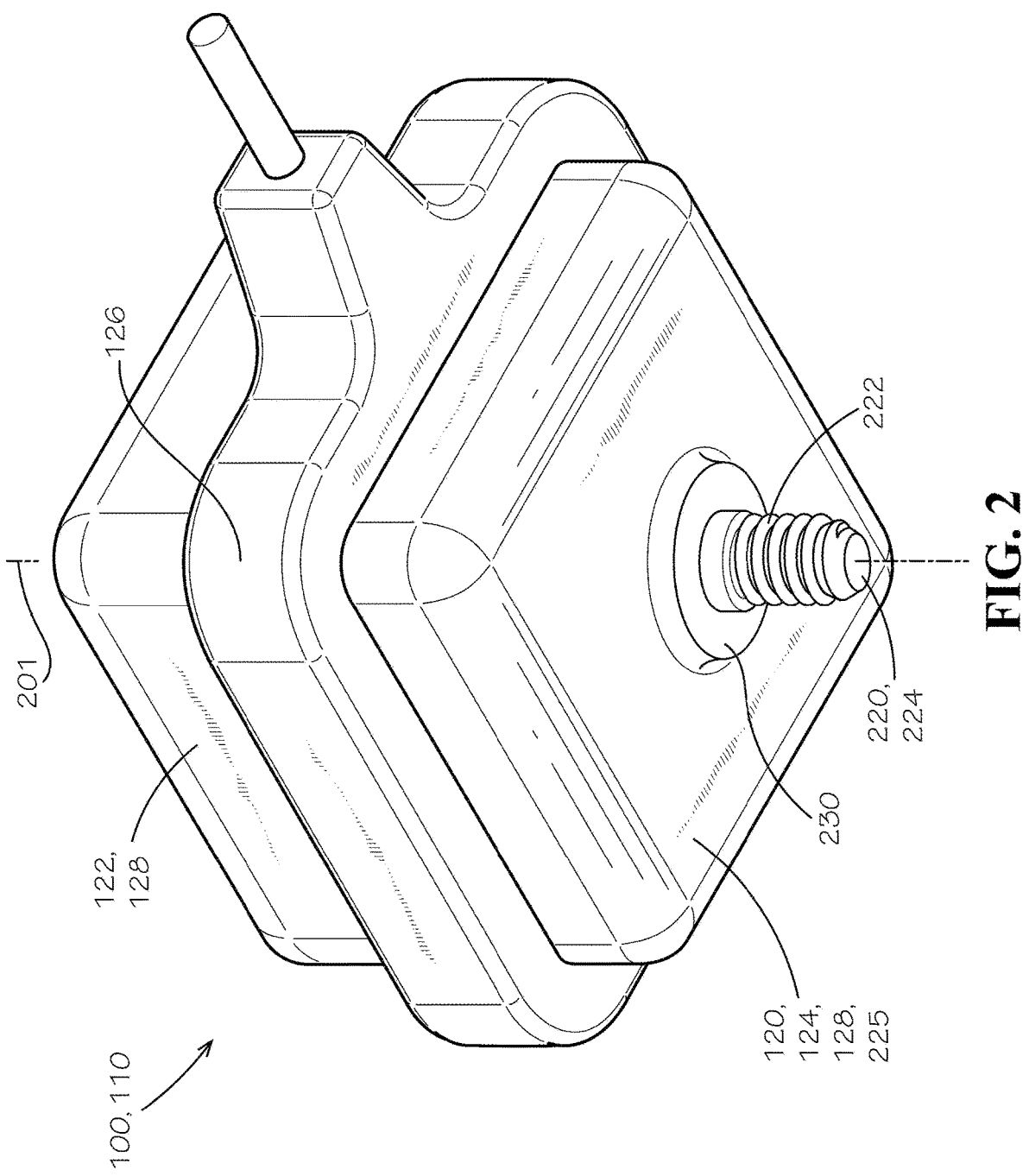
FIG. 2 is a bottom perspective view of the sensor module of FIG. 1.

FIG. 2 is a bottom perspective view of the sensor module 110 of FIG. 1. The sensor enclosure 120 can further comprise a mounting fastener 220. The mounting fastener 220 can be fixed to the sensor enclosure shell 128. Specifically, the mounting fastener 220 can be fixed to the second shell 124 in the current aspect. In the present aspect, the mounting fastener 220 can be molded into the second shell 124. In some aspects, the mounting fastener 220 can be threaded into the second shell 124 or otherwise mechanically engaged with the second shell 124, such as through the use of additional fasteners. In some aspects, the mounting fastener 220 can be integrally formed with the second shell 124. For example and without limitation, the second shell 124 and the mounting fastener 220 can be cast, molded, machined, additively manufactured, or welded together to form a single component. For example and without limitation, the mounting fastener 220 and the second shell 124 can both be formed from a metal in some aspects.

The second shell 124 can define a bottom surface 225, with respect to the present viewing angle. The mounting fastener 220 can extend outwards from the bottom surface 225 of the second shell 124, opposite from the first shell 122. The bottom surface 225 can define a raised boss 230 extending circumferentially around the mounting fastener 220. In the present aspect, the bottom surface 225 can be substantially planar. For example, the bottom surface 225 can be planar with the exception of the raised boss 230. In some aspects, the bottom surface 225 may not define the raised boss 230. In such aspects, the bottom surface 225 can be planar. In some aspects, the bottom surface 225 can be curved, such as being convex for example and without limitation. The bottom surface 225 can be substantially rectangular, such as square for example and without limitation, or any other suitable shape.

The mounting fastener 220 can define a first threaded portion 222. In the present aspect, the first threaded portion 222 can be male threading. In some aspects, the first threaded portion 222 can be female threading. The threading of the first threaded portion 222 can extend from a distal end 224 of the mounting fastener 220 towards the bottom surface 225. In some aspects, the mounting fastener 220 may not extend outwards from the bottom surface 225. For example and without limitation, the mounting fastener 220 can be a female threaded insert positioned flush with or recessed into the bottom surface 225. The mounting fastener 220 can define a fastener axis 201. The mounting fastener 220 can comprise a metal or other material selected to efficiently conduct vibrations.

The mounting fastener 220 can be configured to directly or indirectly mount the sensor module 110 to a component 1302 of a pipe network 1300, as shown and described in greater detail below with respect to FIG. 13. In some aspects, the pipe network 1300 can be a utility distribution network carrying water, gas, or any other fluid. The component 1302 can be a valve, a pipe, a hydrant, a flanged fitting, a meter, a piece of pipe, or any other component of the pipe network 1300, for example and without limitation. The mounting fastener 220 can directly engage the component 1302, such as by screwing directly into a threaded hole or engaging with another fastener, such as a nut or bolt, to fasten to a through hole, for example and without limitation. In some aspects, the mounting fastener 220 can engage with an adaptor 350 (shown in FIGS. 3 and 13), which can be configured to directly or indirectly mount the sensor module 110 to the component 1302. The adaptors 350 can be shaped and constructed from materials configured to efficiently transmit vibrations from the component 1302, through the adaptor 350, to the mounting fastener 220.

As shown in FIGS. 1 and 2 and described with respect to the present viewing angles, the first shell 122 can extend upwards above the over-molded portion 126, and the second shell 124 can extend downwards below the over-molded portion 126. The over-molded portion 126 can be axially positioned between the top surface 123 (shown in FIG. 1) of the first shell 122 and the bottom surface 225 (shown in FIG. 2) of the second shell 124, relative to the fastener axis 201. In some aspects, the over-molded portion 126 can cover a greater portion of the sensor enclosure shell 128. For example and without limitation, the over-molded portion 126 can extend to either or both of the surfaces 123,225. In some aspects, the over-molded portion 126 can partially or completely cover either or both of the surfaces 123,225.

FIG. 3 is a cross-sectional view of the sensor module 110 taken along line 3-3, as shown in FIG. 1. The mounting fastener 220 can define an inner end 324 opposite from the distal end 224. The second shell 124 can define an internal collar 320 extending around the inner end 324 within the sensor cavity 300. The internal collar 320 can be at least partially filled with a sealant, glue, potting, or other material, which can further seal the interface between the mounting fastener 220 and the second shell 124. For example and without limitation, a potting material can be deposited within the internal collar 320, and the potting material can cover at least a portion of the inner end 324 and at least a portion of the second shell 124 immediately surrounding the inner end 324.

The mounting fastener 220 can define a second threaded portion 322. The second threaded portion 322 can be internal, or female, threading within a hole 323 defined within the mounting fastener 220. The hole 323 can be a blind hole extending from the inner end 324 towards the distal end 224. In the present aspect, the hole 323 can extend at least partially through the first threaded portion 222. In some aspects, the second threaded portion 322 can be a male threaded portion extending into the sensor cavity 300.

As shown, the sensor enclosure 120 can define the sensor cavity 300. Specifically, the sensor enclosure shell 128 can define the sensor cavity 300. A sensor 310 can be enclosed within the sensor cavity 300. The sensor 310 can be an acoustic, or vibration, sensor. In the present aspect, the sensor 310 can be a piezoelectric vibration sensor. Piezoelectric vibration sensors are described in greater detail in U.S. Pat. No. 9,528,903, which issued on Dec. 27, 2016, and is hereby incorporated by reference in its entirety.

The sensor 310 can comprise a first piezoelectric crystal 302*a*, a second piezoelectric crystal 302*b*, a base 340, a plurality of calibration masses 306, a spacer portion 304, and a fastener 318. The piezoelectrical crystals 302*a,b* can be coupled to opposite sides of the base 340, such as with an adhesive. The fastener 318 can extend through the piezoelectric crystals 302*a,b*, the base 340, and the spacer portion 304. The calibration masses 306 can be coupled to or integrally formed with the base 340. The calibration masses 306 can be positioned radially outwards from the fastener 318 with respect to the fastener axis 201. The spacer portion 304 can define a threaded hole 305.

The fastener 318 can threadedly engage the threaded hole 305 to secure the piezoelectric crystals 302*a,b* and the base 340 to the spacer portion 304. In the present aspect, the fastener 318 can extend through the spacer portion 304 and threadedly engage the second threaded portion 322 of the mounting fastener 220. In some aspects, the spacer portion 304 can define a male threaded portion, which can threadedly engage the second threaded portion 322. In some aspects, the threaded hole 305 can receive a male threaded portion defined by the mounting fastener 220.

The spacer portion 304 can comprise a metal. Direct metal-to-metal contact between the mounting fastener 220 and the sensor 310, such as that provided by the fastener 318 and/or the interface between the spacer portion 304 and the mounting fastener 220, can efficiently conduct vibrations from the mounting fastener 220 to the sensor 310. In some aspects, the spacer portion 304 and the mounting fastener 220 can be monolithically constructed as one unbroken piece without joints or seams. For example and without limitation, the spacer portion 304 can be integrally formed as a part of the mounting fastener 220, such as by a single piece of metal, and the piezoelectric crystals 302*a,b*, the base 340, and calibration masses 306 can be directly coupled to the mounting fastener 220 by the fastener 318.

The sensor 310 can generate an electrical signal corresponding to the vibrations, which can be transmitted through the cable 190. The cable 190 can enclose multiple wires (not shown), which can connect to the sensor 310 within the sensor cavity 300. As vibrations pass through the sensor 310, the spacer portion 304 can move slightly relative to the calibration masses 306, which can cause the base 340 to flex. Flexing of the base 340 can create stress within the piezoelectric crystals 302*a,b* attached thereto. The application of mechanical stress to the piezoelectric crystals 302*a,b* can create electrical charges within the piezoelectric crystals 302*a,b* corresponding to patterns and intensity of the vibrations. The electrical charges can generate the electrical signal transmitted through the cable 190.

Figure 13:
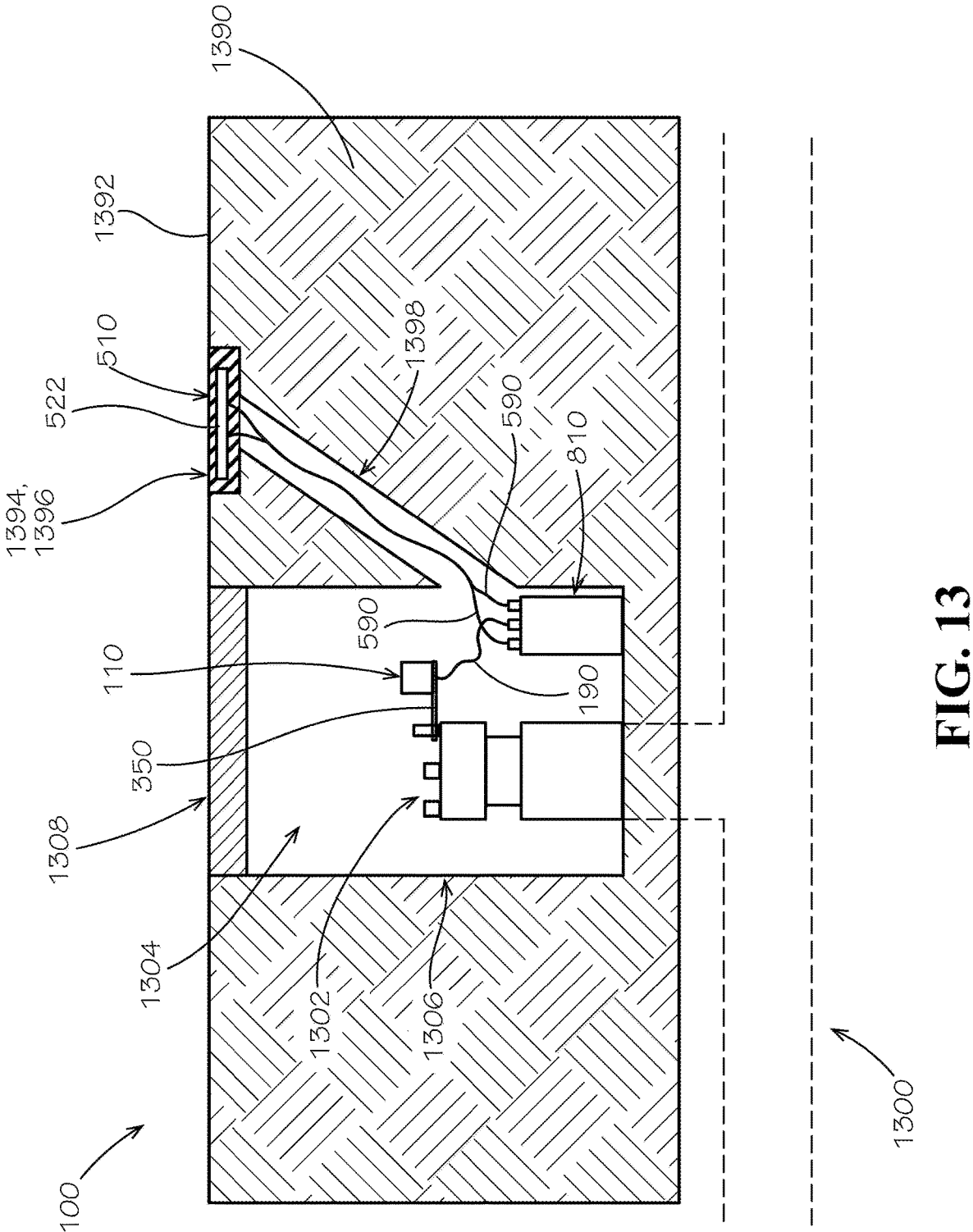
FIG. 13 is a schematic representation of the sensor system of FIG. 1 installed on a pipe network in accordance with another aspect of the present disclosure.

As described above, the mounting fastener 220 can be coupled to the component 1302 (shown in FIG. 13) of the pipe network 1300 (shown in FIG. 13). The sensor 310 can receive vibrations generated within the pipe network 1300 through the connection with the mounting fastener 220. The electrical signal corresponding to these vibrations can be interpreted by a processor, such as a processor PCB 960 of FIG. 9, and phenomena such as leaks, obstructions, slug flow, or other flow variations within the pipe network can be detected.

The mounting fastener 220 is shown threadedly engaging one aspect of the adaptor 350, which can be a magnetic adaptor. In the aspect shown, the distal end 224 can extend through the adaptor 350, and the magnetic adaptor 350 can be used to magnetically couple the sensor module 110 to the component 1302 with the distal end 224 of the mounting fastener 220 directly contacting the component 1302. In some aspects, the adaptor 350 can also directly contact the component 1302. Direct contact between the component 1302 and the mounting fastener 220 can provide a clear acoustic path for vibrations to pass from the component 1302 through the mounting fastener 220. In some aspects, the magnetic adaptor 350 can contact the component 1302 in place of direct contact between the mounting fastener 220 and the component 1302, thereby indirectly coupling the sensor module 110 to the component 1302.

The first shell 122 and the second shell 124 can be joined together at the seam 330. The seam 330 can be formed, such as through the use of an adhesive, welding techniques, or any other suitable method. For example and without limitation, the shells 122,124 can be welded together at the seam 330 by ultrasonic welding. The seam 330 can seal the sensor cavity 300 at the intersection of the shells 122,124.

Figure 4:
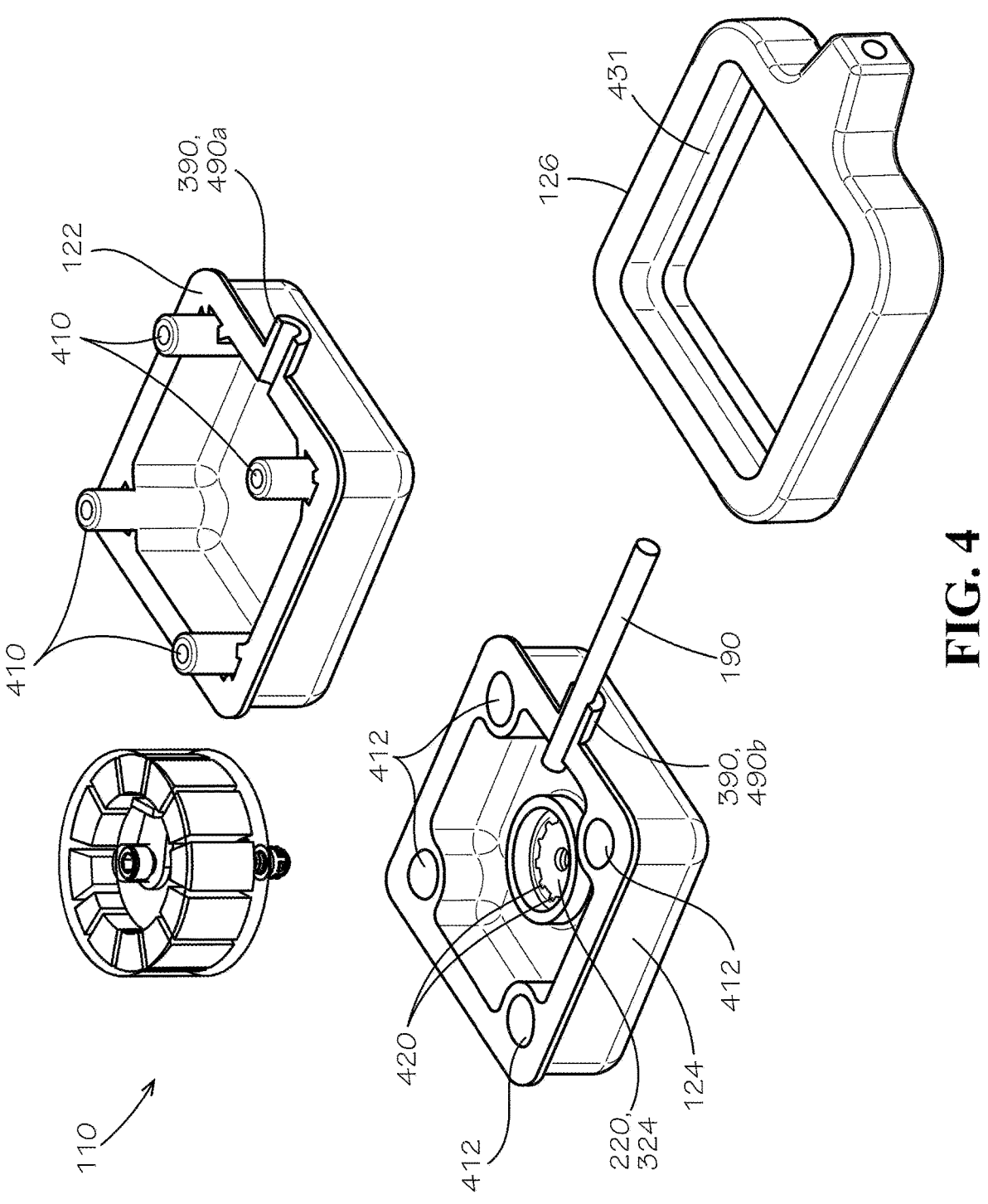
FIG. 4 is a perspective view of the sensor module of FIG. 1 in a disassembled state.

As shown and described in greater detail with respect to FIG. 4, the sensor enclosure shell 128 can define a cable boss 390, which can receive the cable 190. In the present aspect, the cable boss 390 can be defined in part by each of the first shell 122 and the lower shell 124. The seam 330 can extend across at least a portion of the cable boss 390. In the present aspect, the cable 190 can extend through a bore 392 in the seam 330 that can be defined by the cable boss 390. In some aspects, the cable 190 can extend through the first shell 122 or the lower shell 124 rather than through the seam 330. In some aspects, a seal can be formed between the bore 392 of the cable boss 390 and the cable 190. For example and without limitation, a glue, sealant, or other material can be deposited between the cable 190 and the cable boss 390 to further seal the sensor cavity 300. In the present aspect, the sensor cavity 300 can be hermetically sealed.

The over-molded portion 126 can extend around the seam 330 and further seal and protect the seam 330. The over-molded portion 126 can be molded onto and bonded with the sensor enclosure shell 128. In the present aspect, the sensor enclosure shell 128 can define a lip 331 extending around the intersection of the shells 122,124 and the seam 330. The over-molded portion 126 can mechanically engage with the lip 331 to further secure the over-molded portion 126 to the sensor enclosure shell 128. The over-molded portion 126 can also enclose the cable boss 390 and at least a portion of the cable 190. Specifically, the over-molded portion 126 can define a stepped bore 326, which can be sized to receive the cable boss 390 and the portion of the cable 190. The over-molded portion 126 can form a seal with each of the cable 190 and the cable boss 390, such as by bonding with the cable 190 and the cable boss 390 for example and without limitation, thereby further sealing the sensor cavity 300.

FIG. 4 is a perspective view of the sensor module 110 of FIG. 1 in a disassembled state. The over-molded portion 126 is shown removed from the shells 122,124 as a single component for demonstrative purposes. In some aspects, the over-molded portion 126 can be directly molded onto and bonded to the shells 122,124, and the over-molded portion 126 may or may not be capable of being removed from the shells 122,124 as a single piece. In some aspects, the over-molded portion 126 can be a separate component that can be installed on the sensor enclosure shell 128 and bonded to it. The over-molded portion 126 can define a groove 431, which can be formed complimentary to the lip 331 (shown in FIG. 3).

The mounting fastener 220 can define a plurality of radial lugs 420 at the inner end 324. The radial lugs 420 can be embedded in the second shell 124. Engagement between the radial lugs 420 and the second shell 124 can rotationally fix the mounting fastener 220 relative to the second shell 124.

The cable boss 390 can comprise a first cable boss half 490*a* and a second cable boss half 490*b*. The first cable boss half 490*a* can be defined by the first shell 122. The second cable boss half 490*b* can be defined by the second shell 124. During assembly, a sealant, glue, or other material can be deposited in each of the cable boss halves 490*a,b* before fitting the shells 122,124 together around the cable 190, thereby forming the seal between the cable 190 and the cable boss 390.

The shells 122,124 can define a plurality of complimentary posts 410 and pockets 412. In the present aspect, the first shell 122 can define the posts 410, and the second shell 124 can define the pockets 412. In some aspects, the first shell 122 can define the pockets 412, and the second shell 124 can define the posts 410. In some aspects, each shell 122,124 can define both posts 410 and pockets 412. The pockets 412 can be sized to receive the posts 410. In some aspects, the posts 410 can be configured to mechanically engage with the pockets 412, such as with barbs, tabs, ribs, a friction fit, or other features configured to snap into or frictionally engage with the pockets 412. In some aspects, the posts 410 can be received within the pockets 412 and secured with an adhesive. In some aspects, the posts 410 can be secured in the pockets 412 with a mechanical bonding technique, such as welding.

Figure 5:
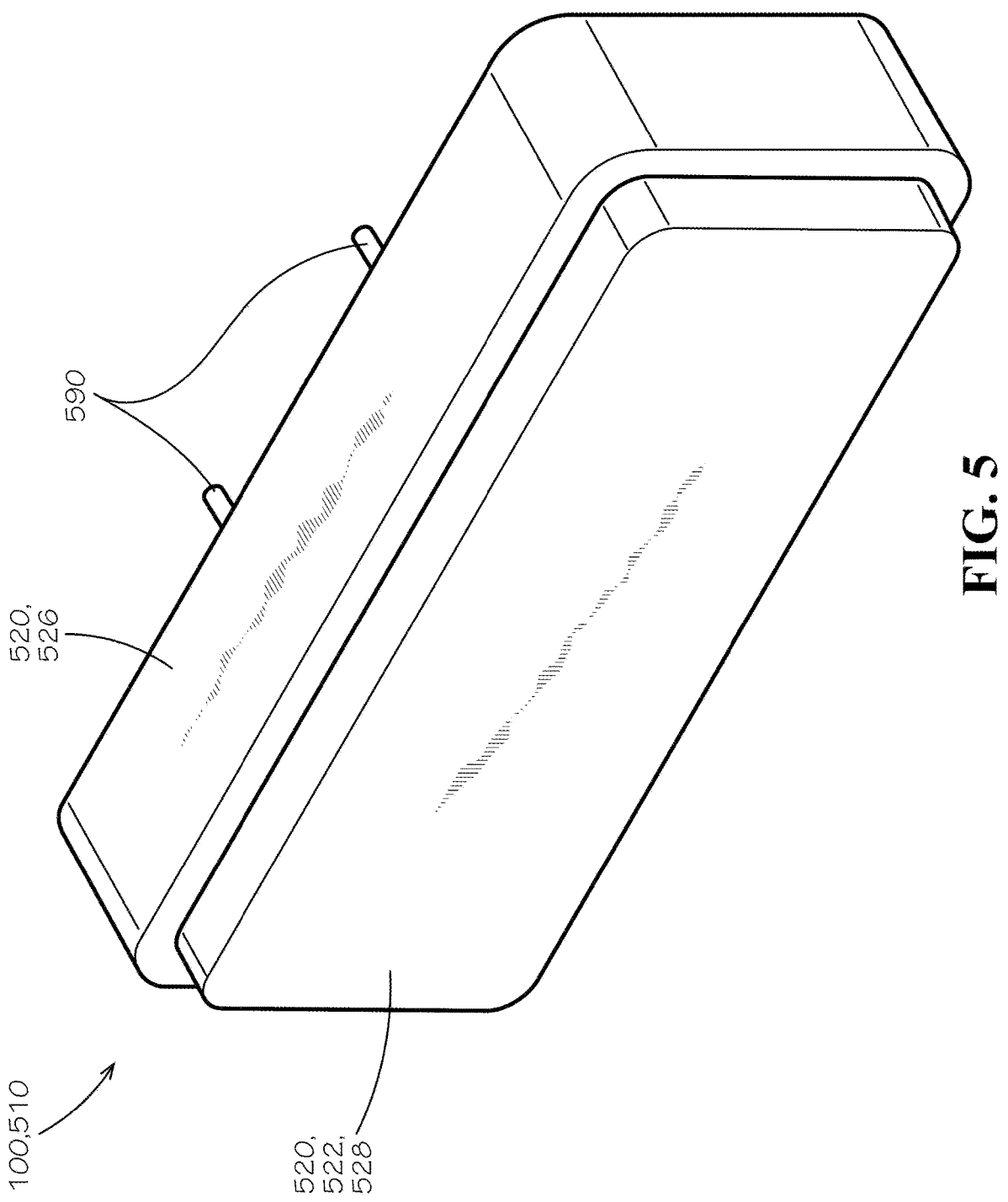
FIG. 5 is a perspective view of an antenna module of the sensor system of FIG. 1.

FIG. 5 is a perspective view of an antenna module 510 of the of the sensor system 100 of FIG. 1. The antenna module 510 can comprise an antenna enclosure 520 and one or more cables 590. In the present aspect, the antenna module 510 can comprise two cables 590. The cables 590 are shown as short lengths for demonstrative purposes, and the length of the cables 590 should not be viewed as limiting. The cables 590 can be any suitable length. The antenna enclosure 520 can comprise an antenna enclosure shell 528 and an over-molded portion 526. The cables 590 can extend through the over-molded portion 526 in the present aspect. The antenna enclosure shell 528 can comprise a first shell 522 and a second shell 524 (shown in FIG. 6). In the present aspect, the second shell 524 can be entirely enclosed within the over-molded portion 526. In some aspects, the cables 590 can extend through the first shell 522, the second shell 524, or both the first shell 522 and the second shell 524.

The antenna enclosure 520 can be hermetically sealed. The antenna enclosure 520 can also be constructed to withstand traffic loads, such as those incurred when car, trucks, and other vehicles drive over the antenna module 510.

Figure 6:
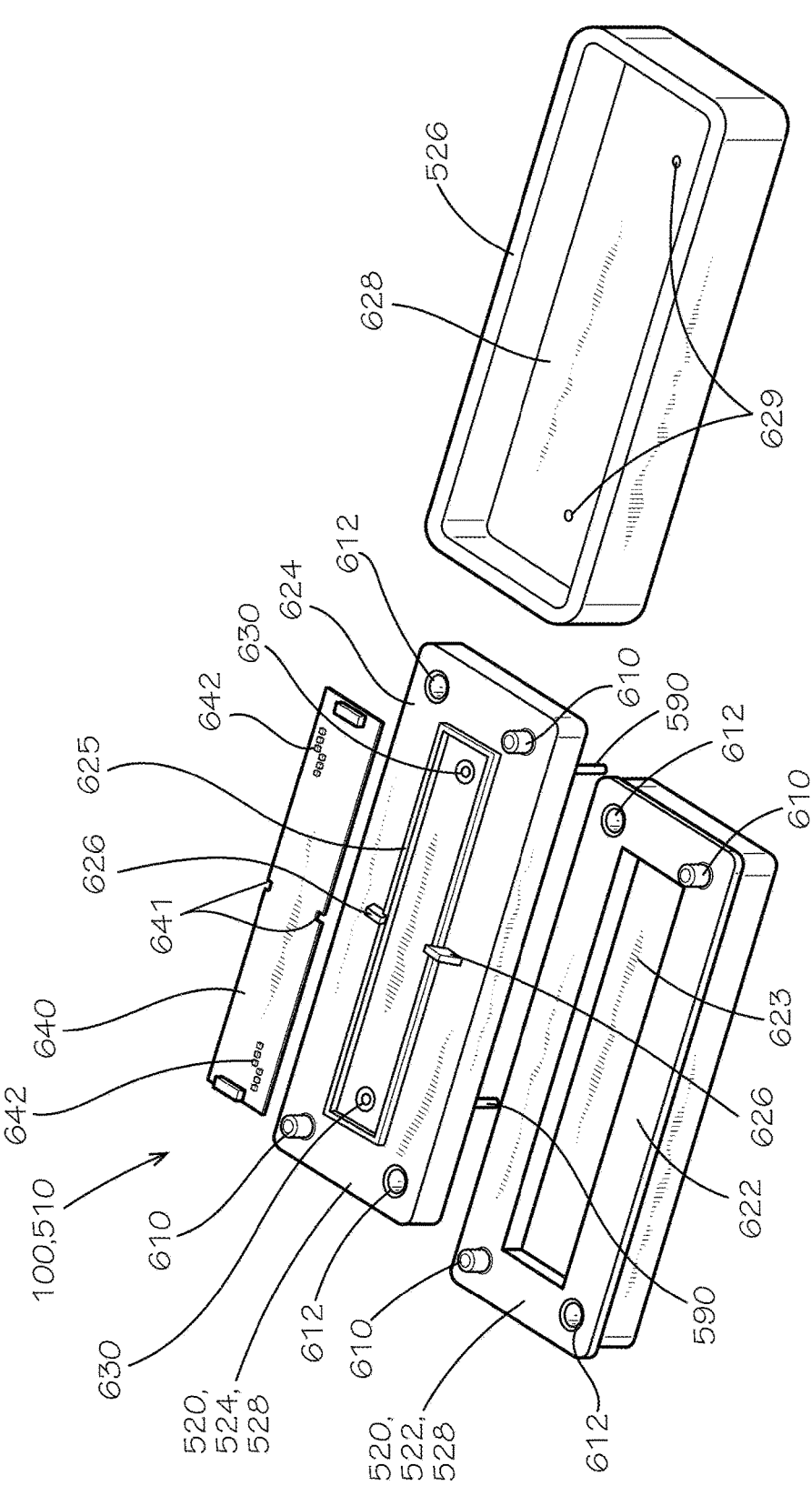
FIG. 6 is a perspective view of the antenna module of FIG. 5 in a disassembled state.

FIG. 6 is a perspective view of the antenna module 510 of FIG. 5 in a disassembled state. The first shell 522 and the second shell 524 can respectively define a pair of inner surfaces 622,624, respectively. In the present aspect, the shells 522,524 can each define a pair of posts 610 and a pair of pockets 612 on the respective inner surfaces 622,624. The posts 610 and pockets 612 can be sized complimentary to one another. In some aspects, the first shell 522 can define the pockets 612, and the second shell 524 can define the posts 610. In some aspects, the first shell 522 can define the posts 610, and the second shell 524 can define the pockets 612. The pockets 612 can be sized to receive the posts 610. In some aspects, the posts 610 can be configured to mechanically engage with the pockets 612, such as with barbs, tabs, ribs, a friction fit, or other features configured to snap into or frictionally engage with the pockets 612. In some aspects, the posts 610 can be received within the pockets 612 and secured with an adhesive. In some aspects, the posts 610 can be secured in the pockets 612 with a bonding technique, such as welding.

The inner surface 622 of the first shell 522 can define an antenna recess 623. The inner surface 624 of the second shell 524 can define a raised lip 625. The raised lip 625 can comprise a pair of mounting tabs 626. The raised lip 625 can be configured for mounting an antenna printed circuit board ("PCB") 640 of the antenna module 510. The antenna PCB 640 can be sized to mount on the raised lip 625. The antenna PCB 640 can define a pair of notches 641, which can receive the mounting tabs 626 to secure the antenna PCB 640 to the raised lip 625. In some aspects, the raised lip 625 can be sized to receive the antenna PCB 640. In some aspects, the raised lip 625 can be sized for the antenna PCB 640 to mount atop the raised lip 625.

The antenna recess 623 and the raised lip 625 can cooperate to provide an air pocket around the antenna PCB 640, which can provide a small degree of freedom of movement of the antenna PCB 640. For example and without limitation, the notches 641 can ride along the mounting tabs 626, relative to the antenna enclosure 520. Movement of the antenna PCB 640 relative to the antenna enclosure 520 can reduce the transmission of vibrations from the antenna enclosure 520 to the antenna PCB 640.

The antenna recess 623 can be sized to receive the antenna PCB 640 and the raised lip 625. The antenna PCB 640 can be sealed within the antenna recess 623. The inner surfaces 622,624 can be coupled together to from a seal around the antenna recess 623. For example and without limitation, the inner surfaces 622,624 can be coupled together with an adhesive, sealant, or other materials extending around the antenna recess 623 and the raised lip 625. In some aspects, the inner surfaces 622,624 can be mechanically bonded together, such as by welding the shells 522,524 together. For example and without limitation, the shells 522,524 can be ultrasonically welded together. In some aspects, the antenna recess 623 can be filled with a potting material. The antenna PCB 640 can be partially or fully encapsulated within the potting material.

The cables 590 can extend through the second shell 524. Specifically, the second shell 524 can define a pair of cable openings 630 extending from the inner surface 624 through the second shell 524. The cable openings 630 can be encircled by the raised lip 625. The cables 590 can electronically connect to the antenna PCB 640. In some aspects, individual wires (not shown) within the cables 590 can connect to the antenna PCB 640. In some aspects, the cables 590 can terminate at connectors, which can engage with complimentary connectors mounted on the antenna PCB 640.

The antenna PCB 640 can comprise one or more antennas 642. In the present aspect, the antenna PCB 640 can comprise two antennas 642; however, the antenna PCB 640 can comprise greater or fewer than two antennas 642. Each antenna 642 can be connected in electrical communication with a separate cable 590. For example and without limitation, the separate antennas 642 can transmit the same information or different information from one another. In the present aspect, one of the antennas 642 can be a GPS antenna, and the other antenna 642 can be a cell antenna, such as an LTE, GSM, CDMA, or other type of antenna. In some aspects, one or both of the antennas 642 can be a different type of antenna, such as AM, FM, WIFI, 4G, 5G, Bluetooth, or any other frequency band, communication standard, or combination thereof.

The over-molded portion 526 can define a recess 628. The over-molded portion 526 can define a pair of openings 629 extending through the over-molded portion 526. The openings 629 can intersect the recess 628. The recess 628 can be sized to receive an entirety of the second shell 524. The recess 628 can also be sized to receive a portion of the first shell 522. For example, the interface or seam between the first shell 522 and the second shell 524 can be enclosed to further seal the antenna enclosure shell 528. In some aspects, the over-molded portion 526 can only enclose or cover a portion of each of the first shell 522 and the second shell 524. For example, the over-molded portion 526 may extend around the seam between the first shell 522 and the second shell 524. The openings 629 can be sized and configured to receive and seal with the cables 590, as shown in FIG. 7.

Figure 7:
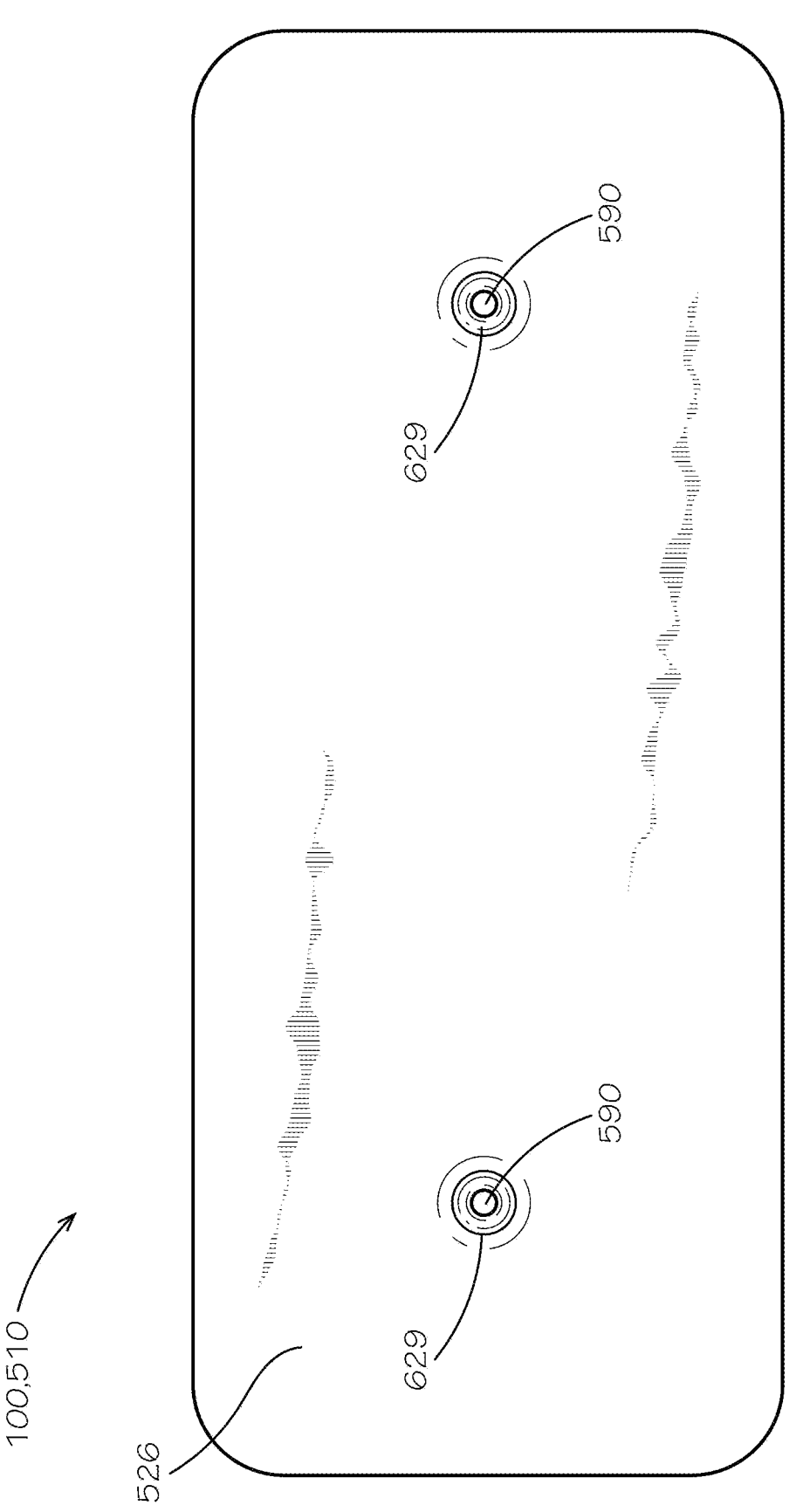
FIG. 7 is a rear view of the antenna module of FIG. 5.

FIG. 7 is a rear view of the antenna module 510 of FIG. 5. As shown, the cables 590 can extend through the openings 629. The over-molded portion 526 can be bonded to the cables 590, which can prevent leaks through the openings 629.

Figure 8:
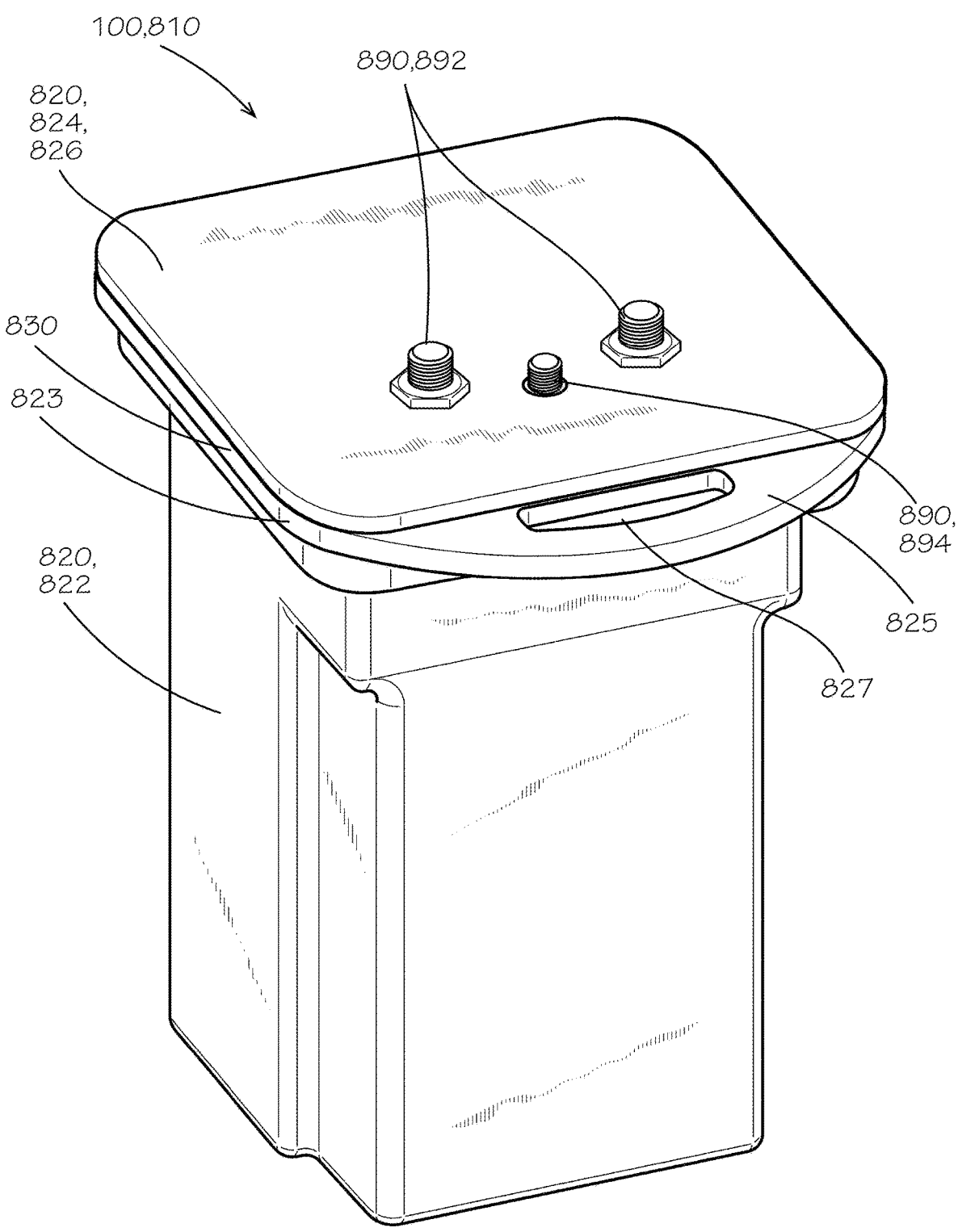
FIG. 8 is a perspective front view of a processor module of the sensor system of FIG. 1.

FIG. 8 is a perspective front view of a processor module 810 of the sensor system 100. The processor module 810 can comprise a processor enclosure 820. The processor enclosure 820 can comprise a container shell 822 and an insert 824. The insert 824 can define a lid portion 826. A plurality of electrical connectors 890 can extend through the processor enclosure 820. In the present aspect, the electrical connectors 890 can extend through the lid portion 826. In some aspects, some or all of the electrical connectors 890 can extend through a different part of the processor enclosure 820, such as the container shell 822.

In the present aspect, two of the electrical connectors 890 can be antenna cable connectors 892. The antenna cable connectors 892 can be configured to electrically connect with the cables 590 of the antenna module 510 (shown in FIG. 5). In the present aspect, one of the electrical connectors 890 can be a sensor cable connector 894. The sensor cable connector 894 can be configured to electrically connect with the cable 190 of the sensor module 110.

A seam, or joint, 830 can be defined between the lid portion 826 and the container shell 822. Specifically, the lid portion 826 can form the seam 830 with a flange 823 of the container shell 822. In some aspects, the seam 830 can be formed by an adhesive, sealant, or other material. In some aspects, the seam 830 can be formed by mechanically bonding the lid portion 826 and the container shell 822 together, such as by welding. For example and without limitation, the lid portion 826 and the container shell 822 can be ultrasonically welded. The processor enclosure 820 can be hermitically sealed. The processor enclosure 820 can be submergible, such as by being placed under water.

A portion of the flange 823 can define a mounting lip 825, with a mounting slot 827. The mounting slot 827 can be engaged with a hook, fastener, or other structure to secure the processor module 810 to another structure.

Figure 9:
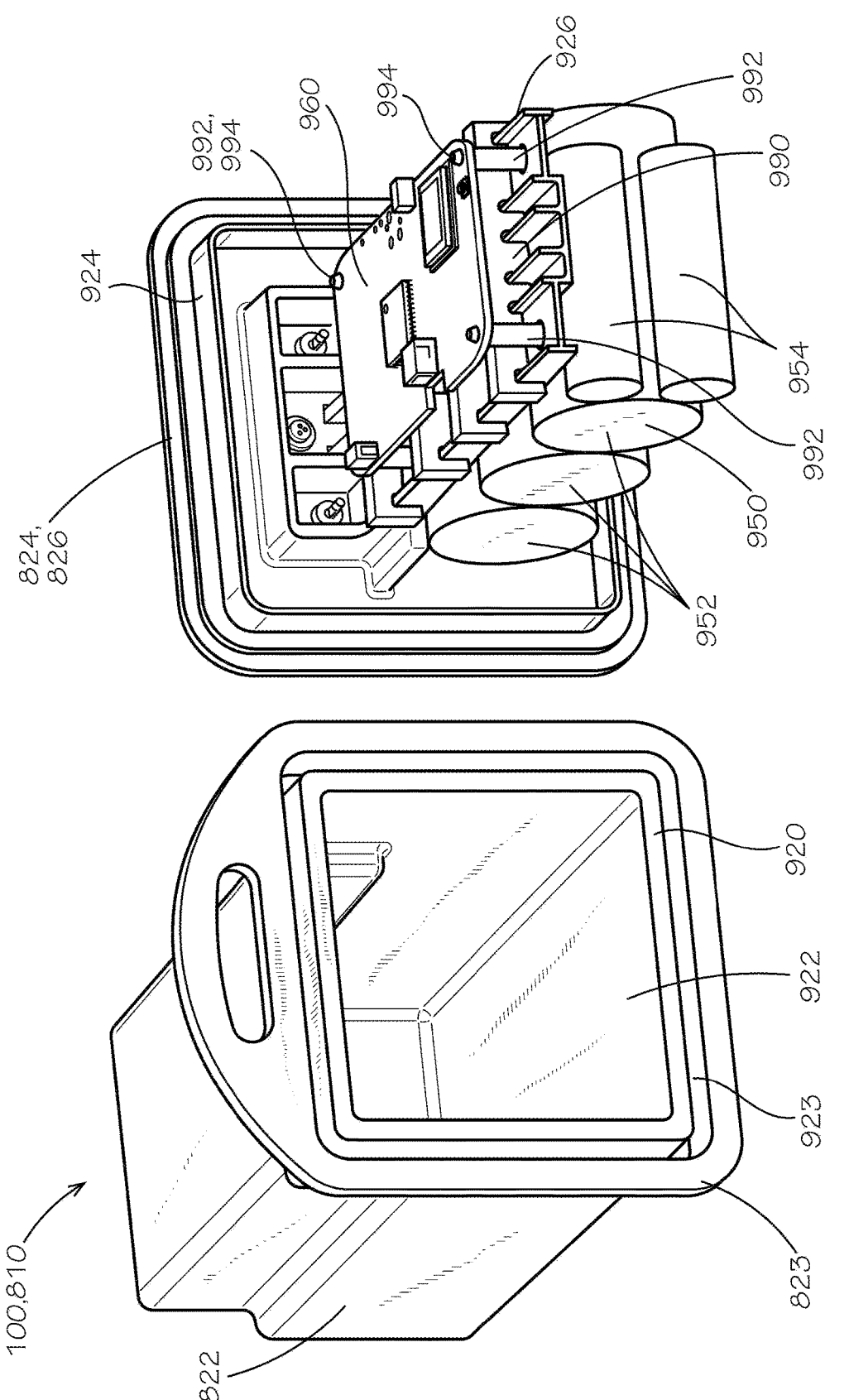
FIG. 9 is a perspective top view of the processor module of FIG. 8 in a partially disassembled state.

FIG. 9 is a perspective top view of the processor module 810 of FIG. 8 in a partially disassembled state. The insert 824 is shown removed from the container shell 822. The container shell 822 can define a cavity 922. The flange 823 can define an opening 920 to the cavity 922.

The flange 823 can define a groove 923 extending around the opening 920.

The lid portion 826 of the insert 824 can define a lip, or tongue, 924 shaped and sized complimentary to the groove 923. Together, the lid portion 826 and the flange 823 can fit together with a tongue-and-groove interface. In some aspects, the tongue 924 and the groove 923 can be secured together, such as with an adhesive, sealant, or other material to seal the seam 830 (shown in FIG. 8). In some aspects, the tongue 924 can be mechanically bonded in the groove 923, such as by being welded. For example and without limitation, ultrasonic welding can couple the tongue 924 and the groove 923.

The insert 824 can define a mounting portion 926 extending outward from the lid portion 826. In the present aspect, the mounting portion 926 can be substantially perpendicular to the lid portion 826. The processor module 810 can further comprise a power supply 950, the processor PCB 960, and a bracket 990. The power supply 950, the processor PCB 960, and the bracket 990 can each be coupled to the mounting portion 926.

In some aspects, the power supply 950 can comprise one or more batteries 952. In some aspects, the power supply 950 can comprise one or more capacitors 954. The power supply 950 can be mounted to the mounting portion 926. The bracket 990 can be mounted directly to the mounting portion 926 in the present aspect. The bracket 990 can be positioned on an opposite side of the mounting portion 926 from the power supply 950. The processor PCB 960 can be mounted above the bracket 990 on a plurality of mounting posts 992. The mounting posts 992 can extend between the mounting portion 926 and the processor PCB 960. In some aspects, the mounting posts 992 can comprise barbed ends 994. The processor PCB 960 can be supported by the mounting posts 992, and the barbed ends 994 can snap through the processor PCB 960 to secure the processor PCB 960 to the mounting portion 926. In some aspects, the processor PCB 960 can mount to the bracket 990 with fasteners, such as screws, bolts, nuts, or other suitable fasteners. In some aspects, the processor PCB 960 can be mounted to the bracket 990. For example and without limitation, in some aspects, the bracket 990 can define the mounting posts 992.

Figure 10:
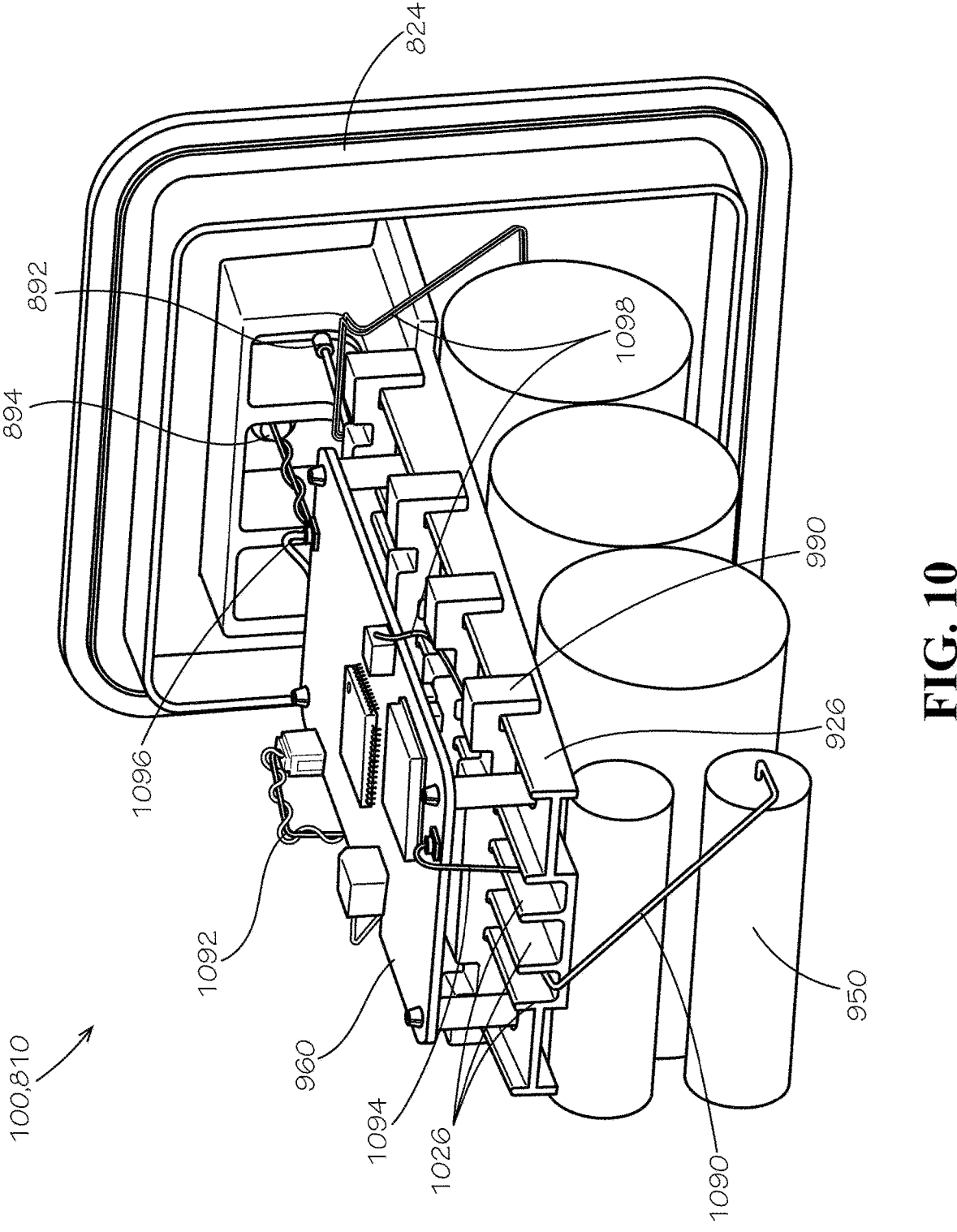
FIG. 10 is a perspective view of an insert of the processor module of FIG. 8.

FIG. 10 is a perspective view of the insert 824 of the processor module 810 of FIG. 8. The bracket 990 can be configured to secure, or retain, various wires 1090,1092, 1094,1096,1098 connected to the processor PCB 960. The mounting portion 926 can define at least one channel 1026. The wires 1090,1092,1094,1096,1098 can be routed through the channels 1026, and the bracket 990 can clamp the wires 1090,1092,1094,1096,1098 to the mounting portion 926, which can protect the wires 1090,1092,1094,1096,1098 from damage and from being snagged and/or torn out from their respective electrical connections.

The wire 1090 can be a power supply wire, which can connect the power supply 950 with the processor PCB 960. The wire 1092 can be a sensor connector wire, which can connect the processor PCB 960 with the sensor cable connector 894. The wire 1094 can be a first antenna connector wire, which can connect the processor PCB 960 with one of the antenna cable connectors 892. The wire 1096 can be a second antenna connector wire, which can connect the processor PCB 960 with the other antenna cable connector 892 (shown in FIG. 8). The wire 1098 can be an antenna wire, which can connect the processor PCB 960 to a processor antenna 1198 (shown in FIG. 11).

Figure 11:
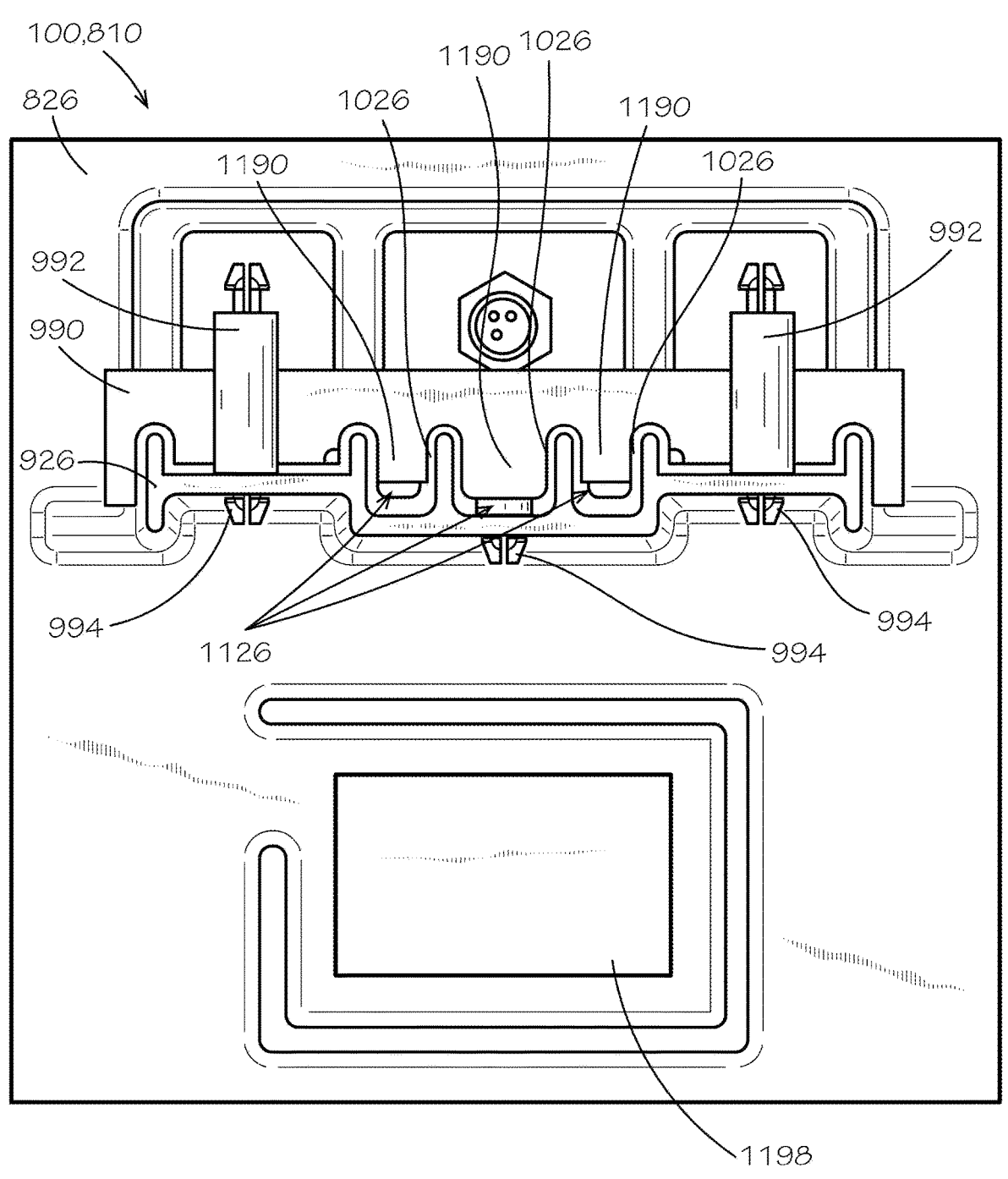
FIG. 11 is an end view of a mounting portion of the insert and a bracket of the processor module of FIG. 8.

FIG. 11 is an end view of the mounting portion 926 and the bracket 990. The processor antenna 1198 can be coupled to the lid portion 826. The processor antenna 1198 can be configured to communicate over short distances. For example and without limitation, the processor antenna 1198 can operate over near-field communication bands and/or standards. The processor antenna 1198 can communicate with a phone, tablet, remote control, or other device to control the processor module 810 and the sensor system 100 as a whole.

The bracket 990 can define wire retention tabs 1190, which can extend into the channels 1026. The wire retention tabs 1190 can be sized and shaped to leave small gaps 1126 between the channels 1026 and the wire retention tabs 1190. The wires 1090,1092,1094,1096,1098 (shown in FIG. 10) can be routed through the gaps 1126, and the wire retention tabs 1190 can frictionally engage the wires 1090,1092,1094, 1096,1098 to secure the wires 1090,1092,1094,1096,1098 between the bracket 990 and the mounting portion 926.

As shown, both the bracket 990 and the mounting posts 992 can be secured to the mounting portion 926 with barbed ends 994, which can be inserted, or stabbed, through the mounting portion 926.

Figure 12:
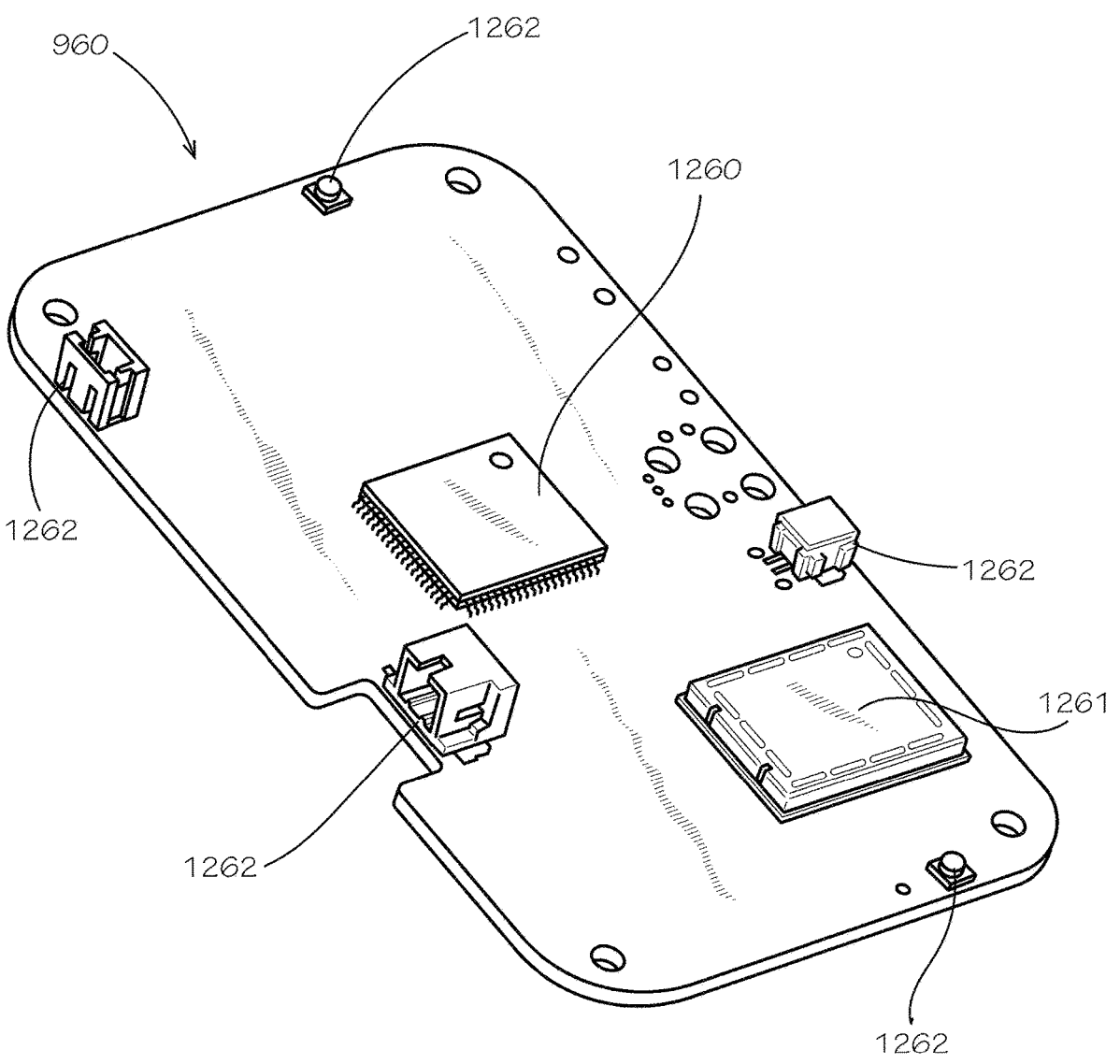
FIG. 12 is a perspective view of a processor PCB of the processor module of FIG. 8.

FIG. 12 is a perspective view of the processor PCB 960 of FIG. 9. The processor PCB 960 can comprise one or more processors 1260. The one or more processors 1260 can perform multiple functions. For example and without limitation, the one or more processors 1260 can analyze the signal received from the sensor module 110 (shown in FIG. 1). The one or more processors 1260 can run one or more algorithms to interpret the signal and corresponding pattern of vibrations from the sensor module 110, such as to determine if a leak may be present. The one or more processors 1260 can produce electrical signals for transmission and/or interpret received electrical signals through one or more of the various antennas 642,1198 (shown in FIGS. 6 and 11, respectively).

In some aspects, the processor PCB 960 can comprise one or more modems 1261. In various aspects, the one or more modems 1261 can be comprised by or separate from the one or more processors 1260. The one or more modems 1261 can be configured to cooperate with one or more of the various antennas 642,1198 to transmit and/or receive wireless signals, which can contain information carried to and/or from the one or more processors 1260. In some aspects, the one or more modems 1261 can comprise an integral antenna, such as a patch antenna for example and without limitation.

The processor PCB 960 can comprise one or more wire connectors 1262, which can each connect with a different one of the wires 1090,1092,1094,1096,1098 (shown in FIG. 10).

FIG. 13 is a schematic representation of the sensor system 100 of FIG. 1 shown in an installed configuration on the pipe network 1300. In the aspect shown, the pipe network 1300 can be buried in the ground 1390. The sensor system 100 can be installed at least partially below a ground surface 1392 defined by the ground 1390. In some aspects, some or all of the sensor system 100 and pipe network 1300 can be positioned above the ground surface 1392. In some aspects, the ground surface 1392 can be a roadway.

In the aspect shown, the component 1302 of the pipe network 1300 can be positioned within a vault cavity 1304 of a vault 1306. The vault 1306 can be set into the ground 1390, and the vault 1306 can be entirely or partially positioned below the ground surface 1392. A lid 1308 of the vault 1306 can be positioned at the ground surface 1392. The lid 1308 can be flush with the ground surface 1392 or positioned above or below the ground surface 1392. The lid 1308 can at least partially enclose the vault cavity 1304. The component 1302 can be any piece of the pipe network 1300, such as a hydrant, a valve, a meter, a flange, a piece of piping, a fitting, or any other structure.

The sensor module 110 can be coupled to the component 1302. In the present aspect, the sensor module 110 can be indirectly coupled to the component 1302 by the adaptor 350. In the present aspect, the adaptor 350 can be a bracket adaptor or other structure configured to directly or indirectly mount the sensor module 110 to the component 1302. The adaptor 350 can comprise an acoustically conductive material, such as a metal for example and without limitation. In some aspects, the sensor module 110 can be directly coupled to the component 1302, with or without the adaptor 350. For example and without limitation, the mounting fastener 220 (shown in FIG. 2) can be directly screwed into the component 1302 to mount the sensor module 110 to the component 1302. As another example, and without limitation, the bracket adaptor 350 can place the mounting fastener 220 in direct contact with the component 1302, wherein the mounting fastener 220 can be positioned in direct contact with the component 1302.

In the present aspect, both the sensor module 110 and the processor module 810 can be positioned within the vault cavity 1304. The sensor module 110 can be connected in electrical communication with the processor module 810 by the cable 190. In the aspect shown, the processor module 810 can be placed at the bottom of the vault cavity 1304. In some aspects, the processor module 810 can be supported or mounted within the vault cavity 1304, such as with the mounting slot 827 (shown in FIG. 8).

In some aspects, either or both of the sensor module 110 and the processor module 810 can be positioned external to the vault cavity 1304. For example and without limitation, the sensor module 110 can be buried in the ground 1390 and connected to a buried portion of the pipe network 1300 or coupled to an above-ground portion of the pipe network 1300. The processor module 810 can be buried or positioned above-ground.

The antenna module 510 can be positioned in a hole 1394 extending into the ground surface 1392. The hole 1394 can be at least partially filled with a filler material 1396. For example and without limitation, the filler material 1396 can be a potting material, asphalt, tar, sealant, cement, or any other suitable material. The filler material 1396 can be selected to provide minimal interference with electromagnetic waves emitted from the antenna module 510. The antenna enclosure 520 (shown in FIG. 5) of the antenna module 510 can be strong and durable enough to resist damage from the passage of cars, trucks, street sweepers, and other vehicles and/or equipment over the embedded antenna module 510.

In some aspects, the antenna module 510 can be at least partially exposed at the ground surface 1392. For example and without limitation, the first shell 522 can be exposed at the ground surface 1392. In some aspects, the antenna module 510 may not be exposed at the ground surface. For example and without limitation, the antenna module 510 can be encapsulated in the filler material 1396. In some aspects, the antenna module 510 can be positioned at least partially in the vault cavity 1304. For example and without limitation, the antenna module 510 can be coupled to the lid 1308.

A bore 1398 can connect the vault cavity 1304 with the hole 1394. The bore 1398 can be drilled, dug, excavated, or otherwise formed through the ground 1390. In some aspects, the bore 1398 can be defined by a conduit (not shown) inserted into the ground 1390. The antenna module 510 can be connected in electrical communication with the processor module 810 by the cables 590, which can extend through the bore 1398.

In operation, the sensor module 110 can monitor vibrations within the pipe network 1300 and transmit an electrical signal corresponding to the pattern of vibrations through the cable 190 to the processor module 810. In some aspects, the processor module 810 can analyze, or otherwise process, the electrical signal from the sensor module 110. The processor module 810 can transmit an electrical signal through the cables 590 to the antenna module 510, and the antenna module 510 can emit electromagnetic radiation signal carrying the information received through the cables 590.

As one possible function of the sensor system 100, the processor module 810 can analyze the electrical signal from the sensor module 110 to identify one or more leaks in the pipe network 1300 based on vibrations generated by the one or more leaks and conducted through the component 1302 to the sensor module 110. Once a leak is detected, the processor module 810 can transmit a signal, such as an alarm signal or status signal, through the antenna module 510.

By physically separating the sensor module 110, the antenna module 510, and the processor module 810, the installation flexibility of the sensor system 100 can be increased. For example, the size of the sensor module 110 can be minimized, and the sensor module 110 can be suited for use in confined locations. Particularly where the sensor system 100 is being retrofit to an existing pipe network 1300, clearance may not be available to add large pieces of equipment, such as in the vault 1306. With the modular nature of the sensor system 100 and the flexible connections provided by the cables 190,590, the sensor system 100 can be positioned around existing equipment by taking advantage of smaller spaces and gaps. The sensor module 110, the antenna module 510, and the processor module 810 can each be hermetically sealed and submersible, and the sensor system 100 can be installed in wet, exposed, corrosive, or other adverse environments.

Figure 14:
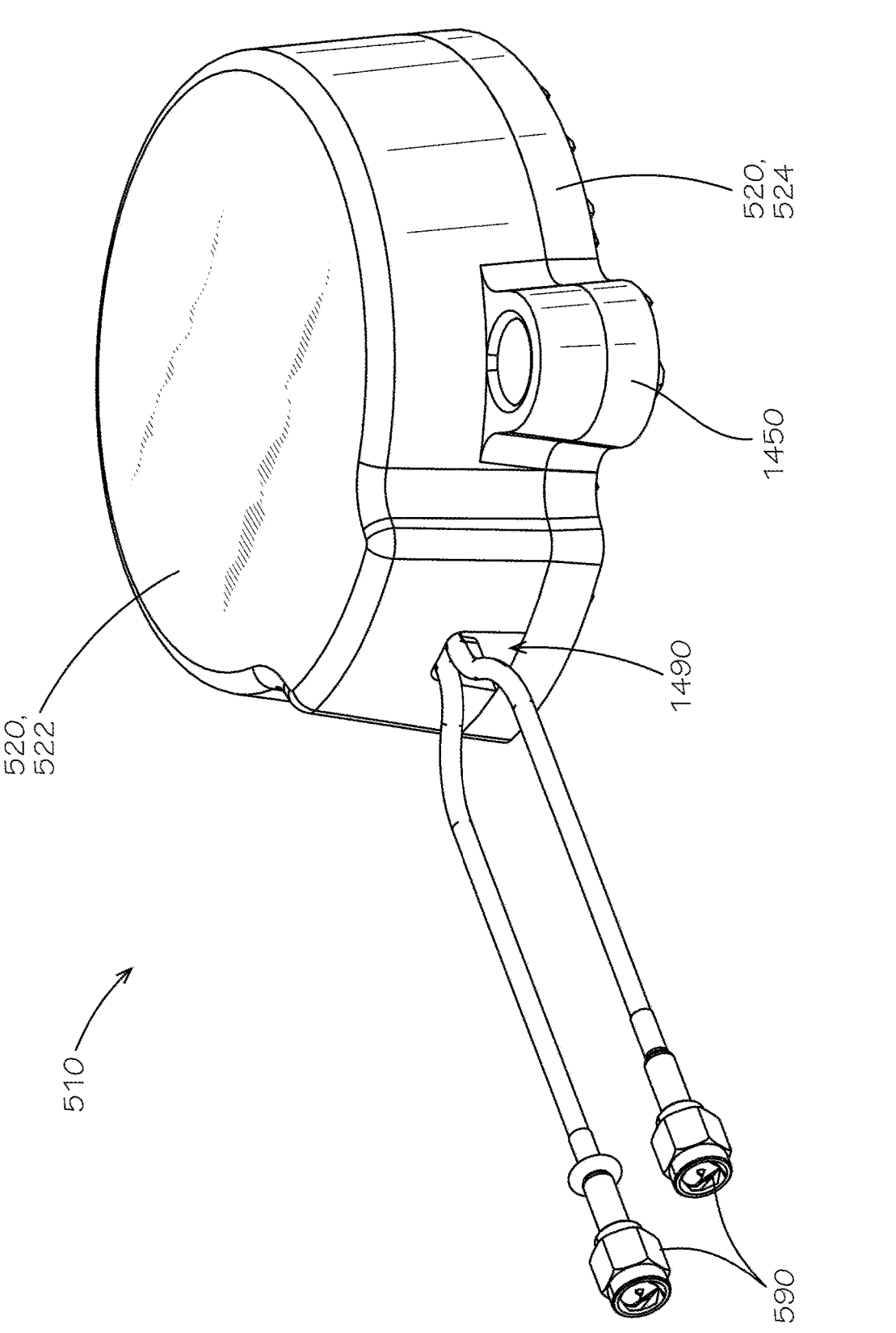
FIG. 14 is a top perspective view of another aspect of the antenna module in accordance with another aspect of the present disclosure.

FIG. 14 is a top perspective view of another aspect of the antenna module 510, which can be utilized with the aspect of the sensor system 100 shown in FIG. 13 or the aspect of the sensor system 100 shown in FIGS. 22-27. For example and without limitation, the antenna module 510 can be positioned in the hole 1394 in the ground surface 1392, as shown in FIG. 13.

The antenna module 510 can comprise an antenna enclosure 520 and one or more cables 590. The antenna module 510 can be configured to transmit and/or receive signals, such as electromagnetic signals for example and without limitation. In the present aspect, the antenna module 510 can comprise two cables 590. The cables 590 are shown as short lengths for demonstrative purposes, and the length of the cables 590 should not be viewed as limiting. The cables 590 can be any suitable length.

In the present aspect, the antenna enclosure 520 can define a substantially rounded shape. The antenna enclosure 520 can comprise a first shell 522 and a second shell 524. In the present aspect, the cables 590 can extend through an opening 1490 defined between the first shell 522 and the second shell 524. In some aspects, the opening 1490 can be sealed around the cables 590, such as with a grommet, gasket, potting, sealant, or other suitable material. In some aspects, the cables 590 can extend through the first shell 522, the second shell 524, or both the first shell 522 and the second shell 524. The antenna enclosure 520 can be hermetically sealed. The antenna enclosure 520 can also be constructed to withstand traffic loads, such as those incurred when car, trucks, and other vehicles drive over the antenna module 510.

Figure 15:
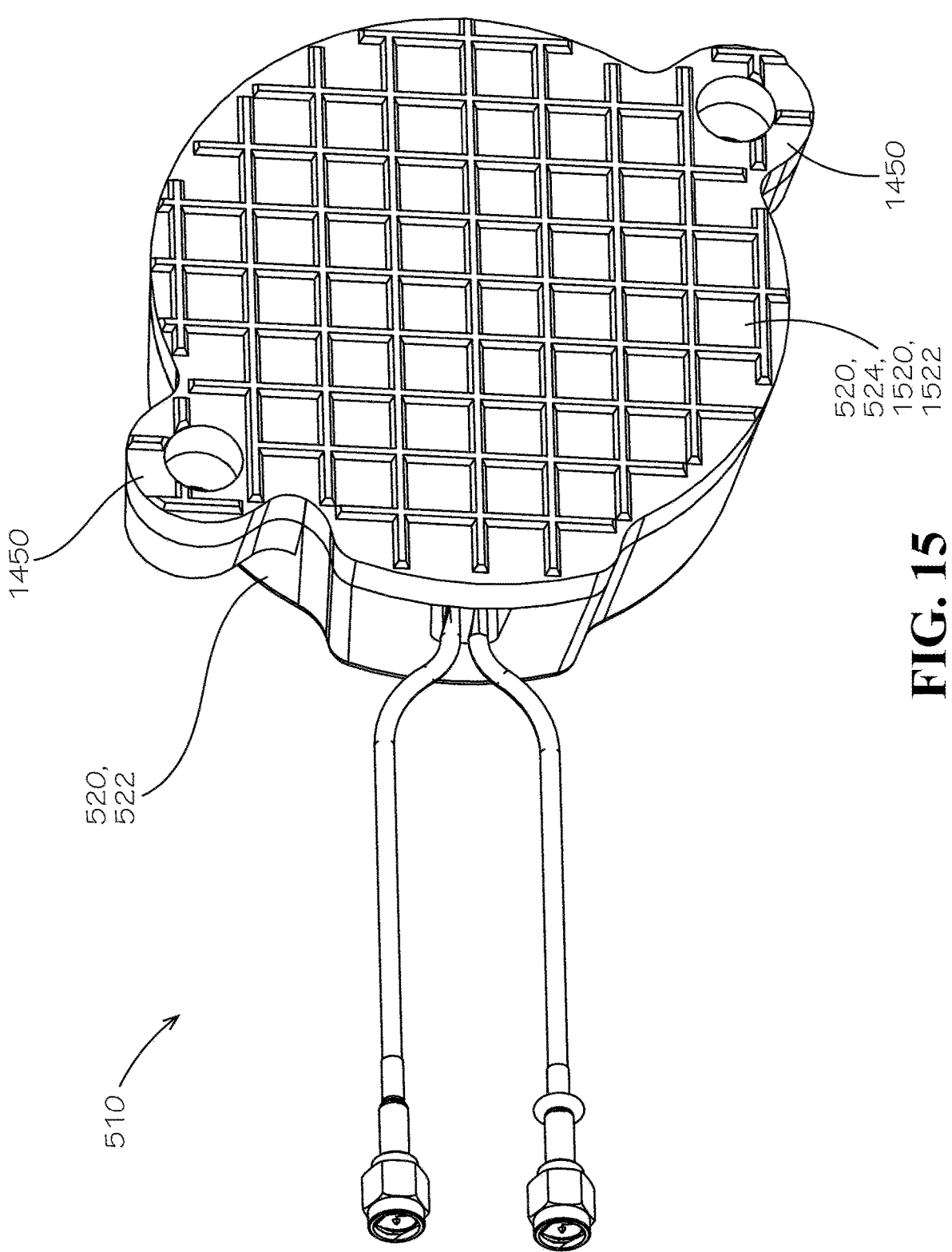
FIG. 15 is a bottom perspective view of the antenna module of FIG. 14.

FIG. 15 is a bottom perspective view of the antenna module of FIG. 14. As shown in FIGS. 14 and 15, the antenna enclosure 520 can define at least one mounting lug 1450. In the present aspect, the antenna enclosure 520 can define two mounting lugs 1450; however, in other aspects, the antenna enclosure 520 can define greater or fewer than two mounting lugs 1450. In the present aspect, both shells 522,524 can define each mounting lug 1450. In some aspects, the first shell 522 or the second shell 524 can separately define one or more of the mounting lugs 1450.

The mounting lugs 1450 can be configured to receive a mounting structure (not shown). For example and without limitation, a stake, spike, nail, anchor, or similar structure can be inserted through each mounting lug 1450 and driven into a mounting surface, such as the ground surface 1392 (shown in FIG. 13) to secure the antenna module 510 to the mounting surface. In some aspects, fasteners, such as bolts, screws, or other suitable fasteners, can be inserted through the mounting lugs 1450 to secure the antenna module 510 to a mounting surface. In some aspects, the mounting lugs can be slipped over mounting structures, such as studs, threaded rods, bolts, or other suitable structures that may be fastened to or embedded in the mounting surface. In such aspects, additional fasteners, such as nuts, pins, or other suitable fasteners, can be utilized to secure the antenna module 510 on the mounting structures.

As shown in FIG. 15, a bottom surface 1520 of the antenna enclosure 520 can define a textured surface 1522. The textured surface 1522 can be configured to provide traction between the antenna enclosure 520 and the mounting surface, such as the ground surface (shown in FIG. 13), or any sealant, glue, potting, asphalt, cement, grout, concrete, or other suitable filler material utilized to secure the antenna module 510 to the mounting surface and/or fill a cavity at least partially containing the antenna module 510, such as the hole 1394 (shown in FIG. 13) for example and without limitation. The textured surface 1522 can cooperate with any mounting fasteners or structures inserted through the mounting lugs 1450 to secure the antenna module 510 in place. In the present aspect, the textured surface 1522 can define a grid or waffle pattern. In other aspects, the textured surface 1522 can define a different pattern defined by raised and/or recessed features.

Figure 16:
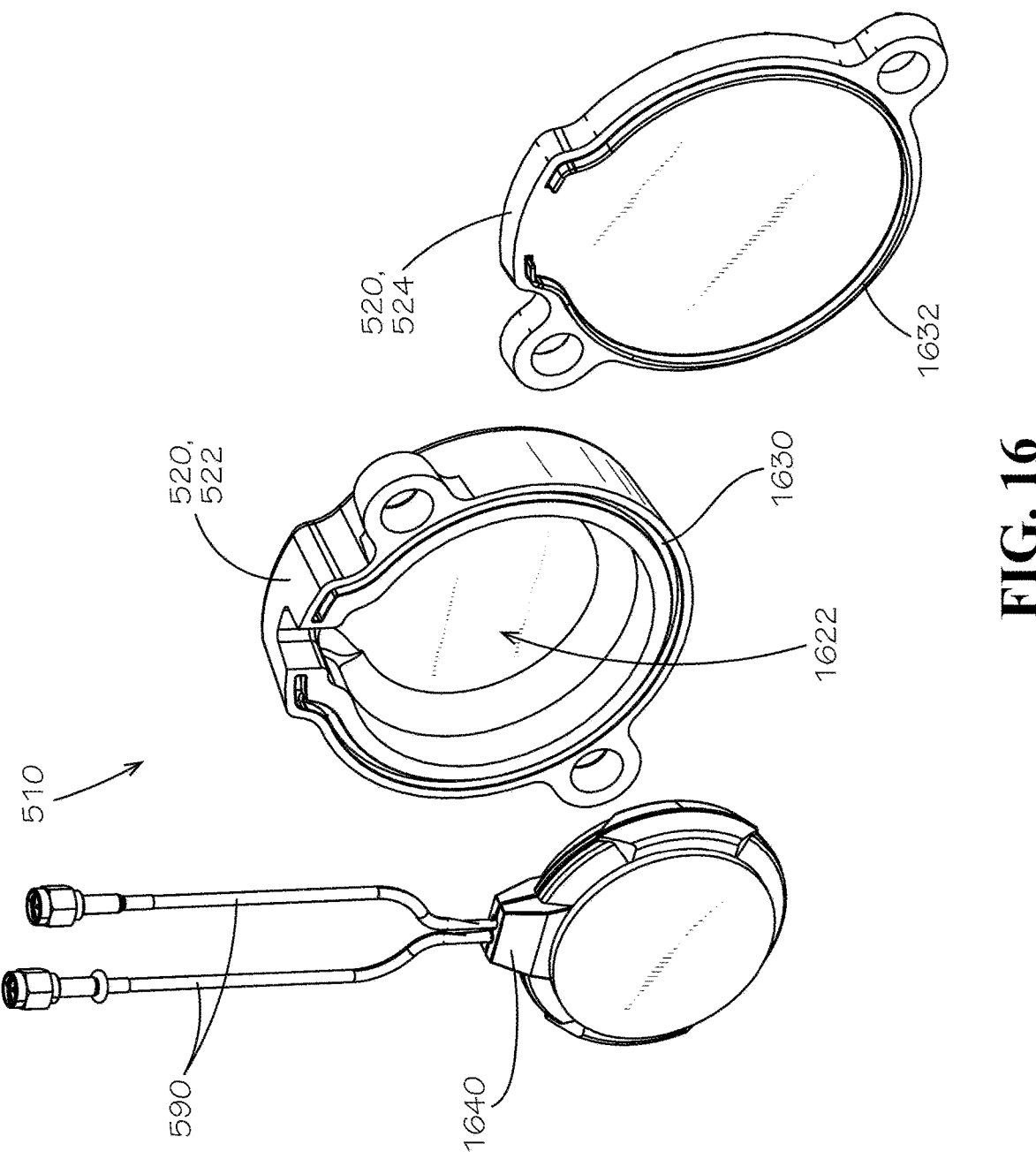
FIG. 16 is a partially exploded view of the antenna module of FIG. 14 showing an antenna assembly of the antenna module.

FIG. 16 is a partially exploded view of the antenna module 510 of FIG. 14. As shown, the cables 590 can connect to an antenna assembly 1640, which can be housed within the antenna enclosure 520 when the antenna module 510 is in an assembled state as shown in FIGS. 14 and 15. In the present aspect, the first shell 522 can define a recess 1622, which can receive the antenna assembly 1640, and the second shell 524 can be formed as a lid, which can at least partially enclose the recess 1622. In some aspects, the second shell 524 can define the recess 1622. In some aspects, both shells 522,524 can define recesses, which can together receive the antenna assembly 1640.

The shells 522,524 can define a tongue-and-groove seal when the antenna enclosure 520 is assembled. In the present aspect, the first shell 522 can define a groove 1630 extending around the recess 1622, and the second shell 524 can define a complimentary tongue 1632, which can be received by the groove 1630. In some aspects, the first shell 522 can define the tongue 1632, and the second shell 524 can define the groove 1630. During assembly, the tongue-and-groove can be bonded together, such as with a glue or welding technique for example and without limitation, or otherwise sealed.

The enclosure 520 can comprise materials selected to minimize interference to signals transmitted and/or received by the antenna assembly 1640. For example and without limitation, the antenna assembly 1640 can be configured to communicate via the transmission and/or reception of electromagnetic waves. The enclosure 520 can comprise materials, such as nonmetallic materials, which can minimize interference with the antenna assembly 1640. For example and without limitation, the enclosure 520 can comprise a polymer, composite, or any other suitable material. However, in some aspects, the enclosure 520 can comprise metallic materials.

Figure 17:
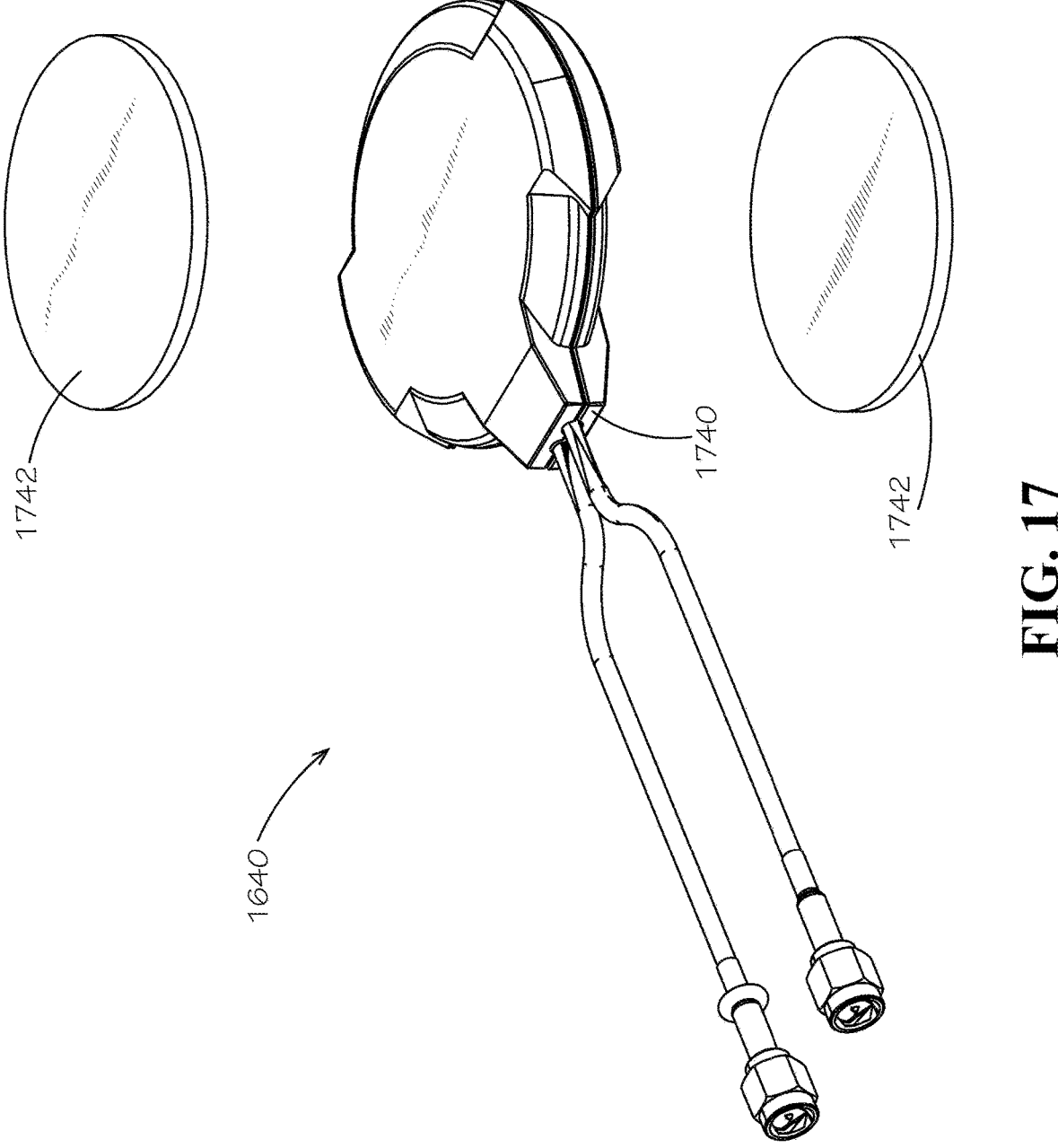
FIG. 17 is an exploded view of the antenna assembly of FIG. 16.

FIG. 17 is an exploded view of the antenna assembly 1640 of FIG. 16. The antenna assembly 1640 can comprise an antenna 1740 and at least one pad 1742. In the present aspect, two pads 1742 can be attached to opposite sides of the antenna 1740. In some aspects, the antenna assembly 1640 can comprise greater or fewer than two pads 1742. In some aspects, the at least one pad 1742 can be adhered to the antenna 1740. In some aspects, the at least one pad 1742 can comprise a polymer or rubber material, such as ethylene propylene diene monomer ("EPDM"), polychloroprene ("Neoprene"), polypropylene, polyethylene, or any other suitable material. The at least one pad 1742 can protect the antenna 1740 from impact and vibration, for example and without limitation. The materials of the at least one pad 1742 can be selected to minimize interference with the antenna assembly 1640 (shown in FIG. 16). For example and without limitation, the at least one pad 1742 can comprise a non-metallic material; however, in some aspects, one or more pads of the at least one pad 1742 can comprise a metallic material.

Figure 18:
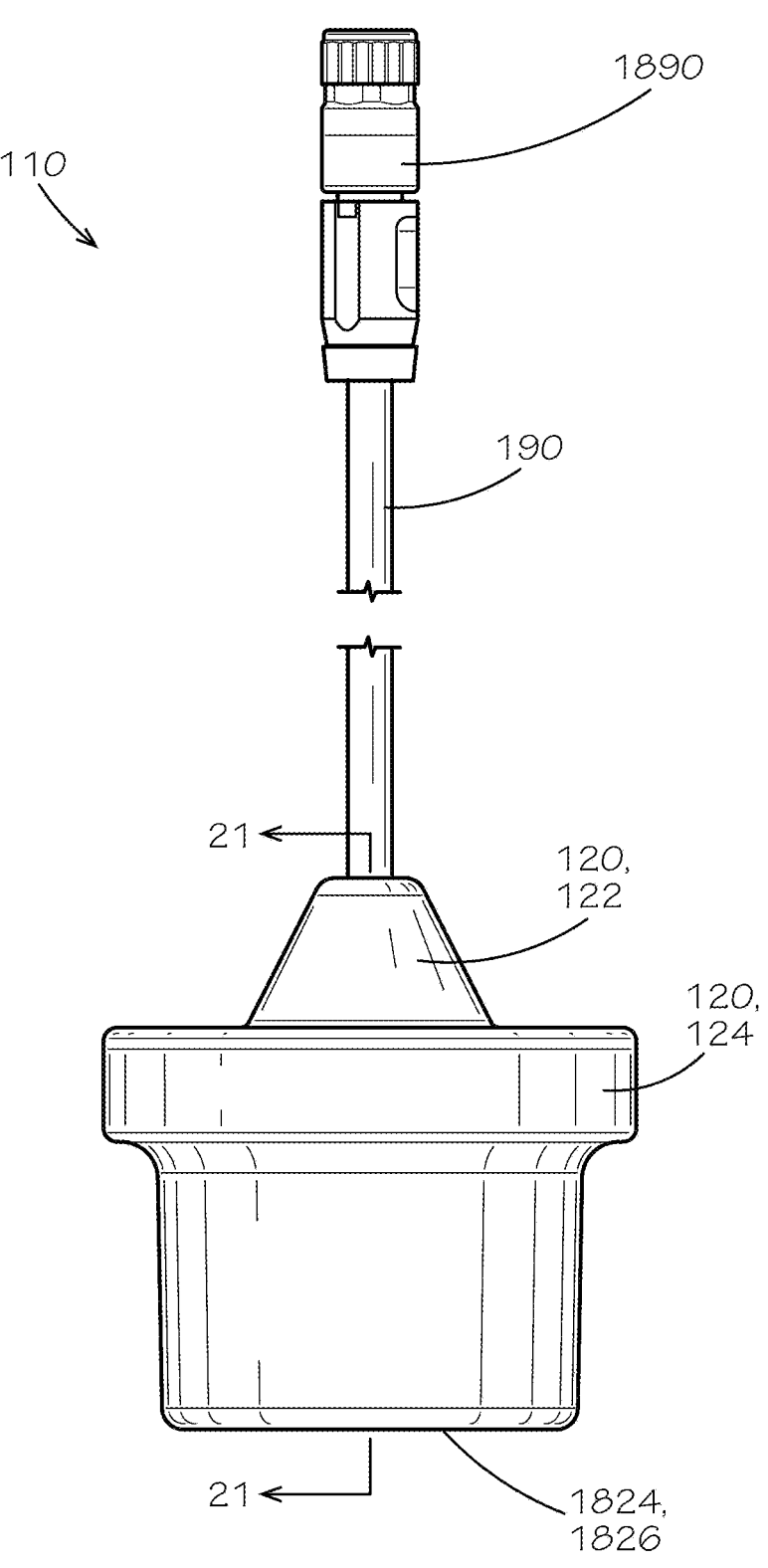
FIG. 18 is a front view of another aspect of the sensor module in accordance with another aspect of the present disclosure.

FIG. 18 is a front view of another aspect of the sensor module 110, which can be utilized with the aspect of the sensor system 100 shown in FIG. 13 or the aspect of the sensor system 100 shown in FIGS. 22-27. The sensor module 110 can comprise a sensor enclosure 120 and a cable 190. The sensor enclosure 120 can be hermetically sealed, and the sensor module 110 can be configured to be fully submerged, such as for underwater applications for example and without limitation.

In the present view, the cable 190 is represented by a short length, which should not be viewed as limiting. The cable 190 can be any suitable length. The cable 190 can comprise a connector 1890 disposed opposite from the sensor enclosure 120. In some aspects, the connector 1890 can be a waterproof connector.

The sensor enclosure 120 can comprise a first shell 122 and a second shell 124. The cable 190 can extend through the first shell 122. The second shell 124 can define a bottom surface 1824 at a bottom end 1826 of the second shell, position opposite from the cable 190. In the present aspect, the bottom surface 1824 can be a flat surface.

Figure 19:
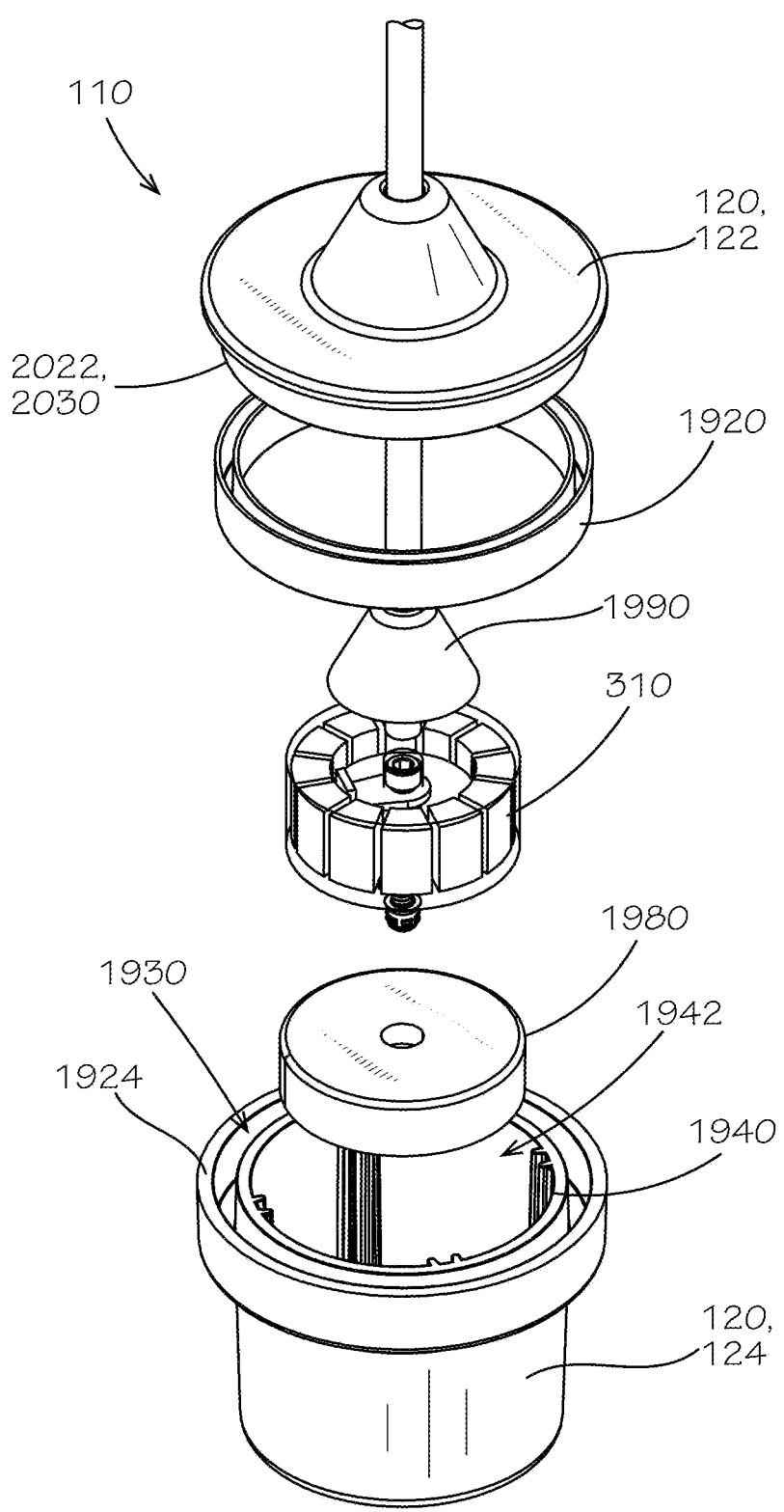
FIG. 19 is an exploded view of the sensor module of FIG. 18.
Figure 20:
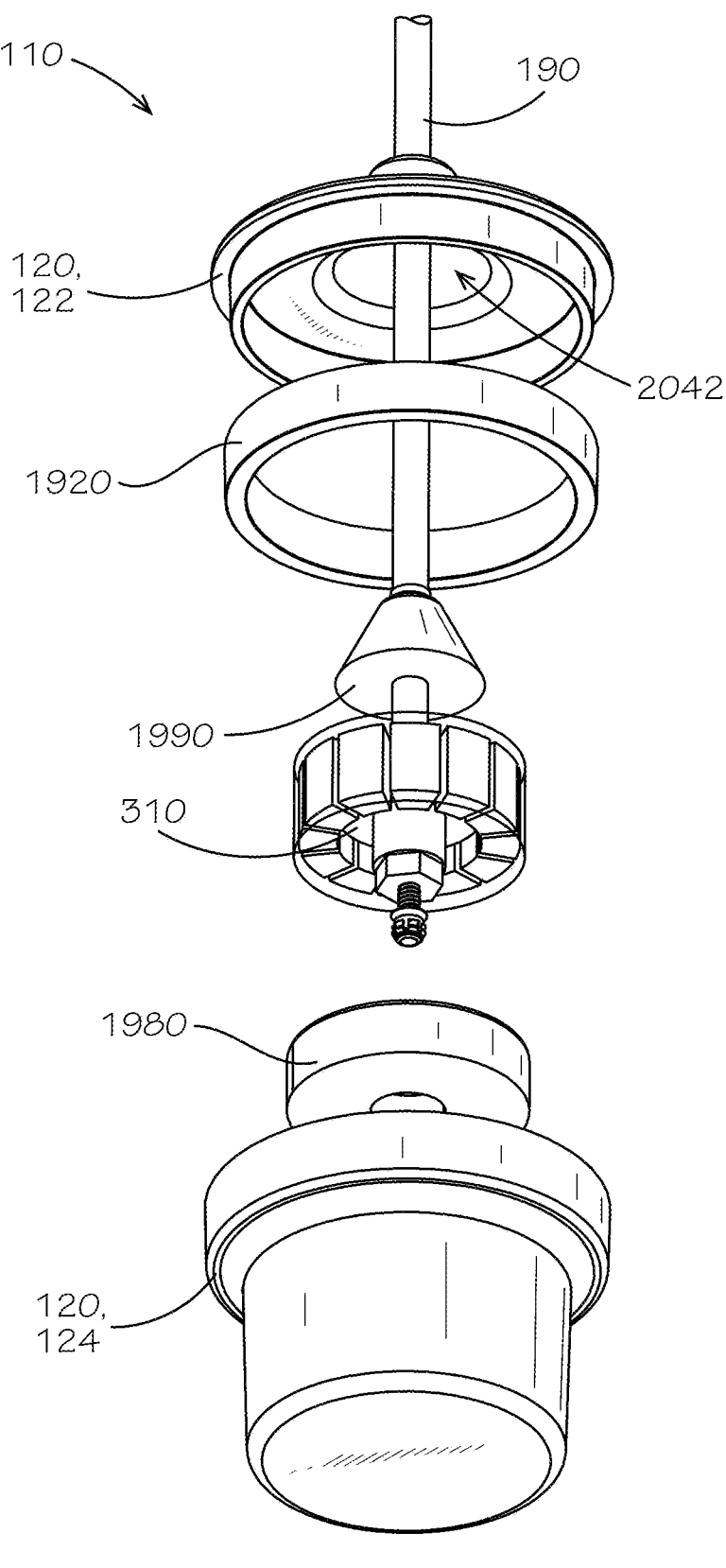
FIG. 20 is an exploded view of the sensor module of FIG. 18.

FIGS. 19 and 20 are perspective views of the sensor module 110 shown in an exploded state. The sensor module 110 can further comprise a cable seal 1990, an enclosure seal 1920, a magnet 1980, and a sensor 310 at least partially positioned within the sensor enclosure 120.

As shown in FIG. 19, the second shell 124 can define a top end 1924 positioned opposite from the bottom surface 1824 (shown in FIG. 18). The second shell 124 can define a sensor cavity 1942. The top end 1924 can define a groove 1930 and an opening 1940 to the sensor cavity 1942. The groove 1930 can extend around the opening 1940. The first shell 122 can define a tongue 2030 at a bottom end 2022 of the first shell 122. The enclosure seal 1920 can be shaped and sized to fit within the groove 1930 and receive the tongue 2030 to form a seal between the shells 122,124.

Figure 21:
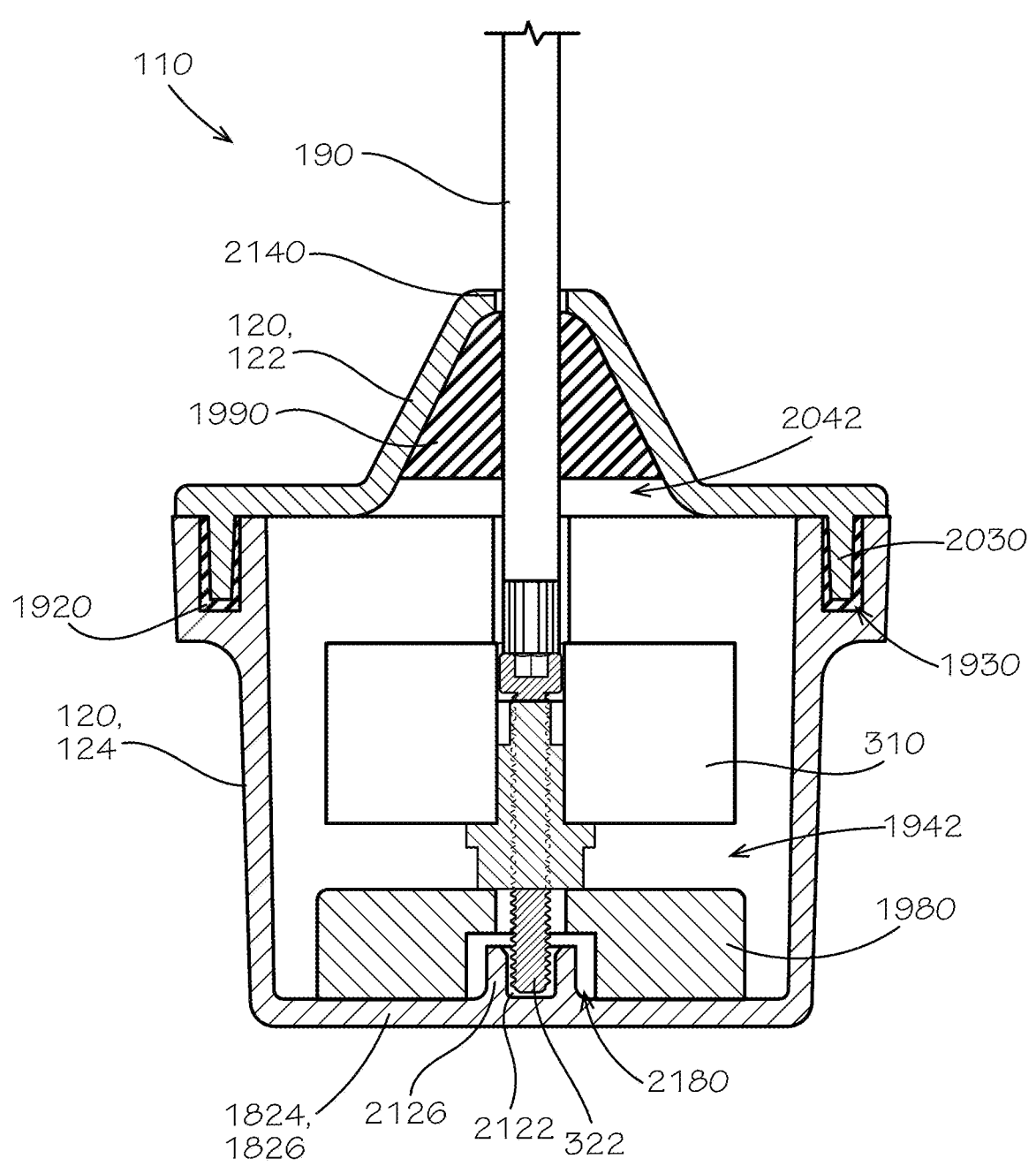
FIG. 21 is a partial cross-sectional view of the sensor module of FIG. 18 taken along line 21-21 shown in FIG. 18.

Turning to FIG. 20, the first shell 122 can define a recess 2042 surrounding a cable opening 2140 (shown in FIG. 21). The cable 190 can extend through the cable opening 2140 and the recess 2042. The cable seal 1990 can fit around the cable 190 and be shaped complimentary to the recess 2042 so that the cable seal 1990 can seal the cable opening 2140 when the cable seal 1990 is positioned in the recess 2042.

The cable seal 1990 and the enclosure seal 1920 can hermetically seal the enclosure 120.

In the aspect shown, the cable seal 1990 and/or the enclosure seal 1920 can be discrete components, which can be formed separately from the other components of the sensor module 110. For example and without limitation, the cable seal 1990 and/or the enclosure seal 1920 can be molded from an elastomer, plastic, rubber, or other suitable material. The cable seal 1990 and/or the enclosure seal 1920 can then be fit to the respective components to be sealed. In such aspects, a glue, sealant, or other suitable material can be utilized to adhere or otherwise bond the seals 1920,1990 to the respective components.

In some aspects, such as the aspect of FIG. 21, the cable seal 1990 and/or the enclosure seal 1920 can be formed in place. For example and without limitation, with the cable 190 extending through the cable opening 2140, a sealant, potting, adhesive, caulk, or other suitable material can be deposited in the recess 2042, wherein the material can cure or otherwise harden to form the cable seal 1990. In such aspects, the cable seal 1990 can be bonded to the cable 190 and the first shell 122. This can fix the first shell 122 in place along the cable 190 in some aspects.

As another nonlimiting example, a sealant, potting, adhesive, caulk, or other suitable material can be deposited in the groove 1930 of the second shell 124, and the tongue 2030 can be inserted into the groove 1930, such that the material can conform to the shape of the groove 1930 and the tongue 2030 while the material cures or otherwise hardens to form the enclosure seal 1920. In such aspects, the enclosure seal 1920 can be bonded to the shells 122,124.

FIG. 21 is partial cross-sectional view of the sensor module 110 taken along line 21-21 shown in FIG. 18.

The cable 190 can be in electrical communication with the sensor 310. The sensor 310 and the magnet 1980 can be positioned within the sensor cavity 1942. The second shell 124 can define a raised boss 2126 within the sensor cavity 1942. The magnet 1980 can define an aperture 2180, which can fit over the raised boss 2126. A portion of the sensor 310 can extend through the aperture 2180, and the sensor 310 can be coupled to the second shell 124. In the present aspect, a threaded portion 322 of the sensor 310 can be coupled to the second shell 124. The threaded portion 322 can threadedly engage a threaded insert 2122, which can define the threaded hole 2130. The threaded insert 2122 can fit within the raised boss 2126. In some aspects, the threaded insert 2122 can be a barbed insert pressed into the raised boss 2126. In some aspects, the raised boss 2126, itself, can define female threading for receiving the threaded portion 322 of the sensor 310.

By inserting the sensor 310 through the magnet 1980 and coupling the sensor 310 to the second shell 124, the sensor 310 can act as a fastener to secure the magnet 1980 adjacent to the bottom end 1826 of the second shell 124. The sensor module 110 can be magnetically coupled to a magnetic object (whether magnetized or not) to secure the bottom surface 1824 against the object. The sensor module 110 can detect vibrations passing from the object through the bottom end 1826 to the sensor 310. As shown, the sensor cavity 1942 surrounding the sensor 310 can minimize contact of the sensor 310 with other materials that might otherwise dampen vibrations travelling to the sensor 310. In some aspects, it may be desirable to at least partially fill the sensor cavity 1942 surrounding the sensor 310, such as with potting for example and without limitation.

Figure 22:
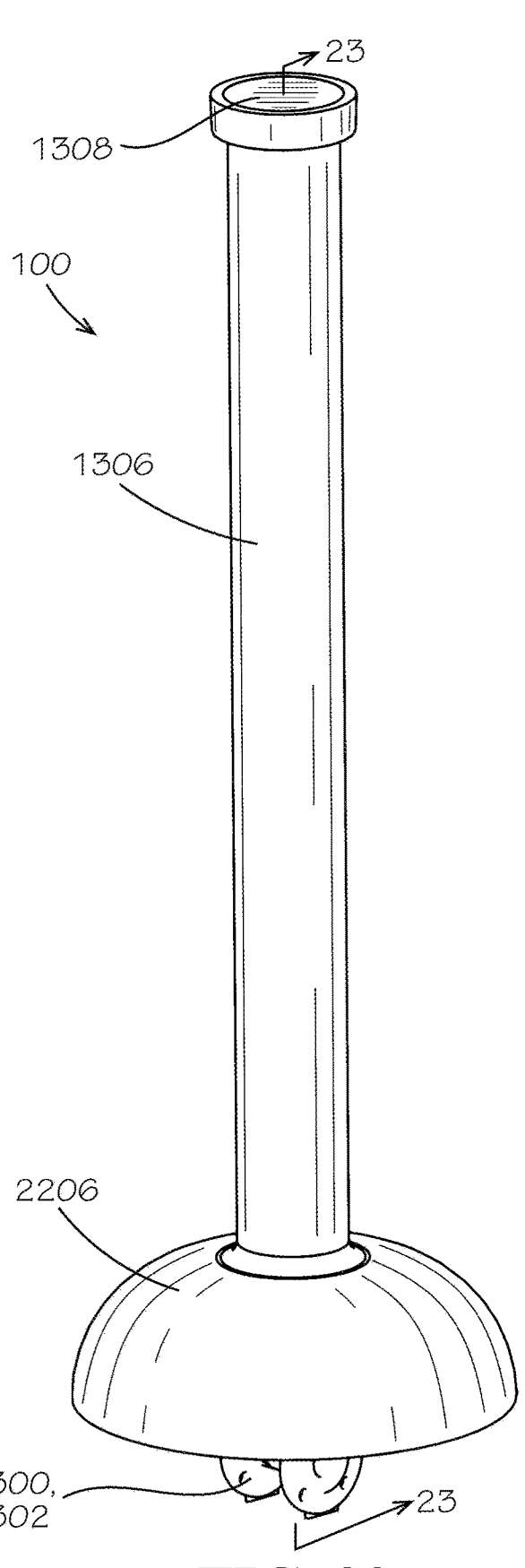
FIG. 22 is a perspective view of another aspect of the sensor system and the vault installed on a pipe network in accordance with another aspect of the present disclosure.

FIG. 22 is a perspective view of another aspect of the sensor system 100 installed on a pipe network 1300. A vault 1306 can fit over at least a portion of the pipe network 1300 and enclose the sensor system 100. In the present aspect, a bell 2206 of the vault 1306 can fit over a component 1302 of the pipe network 1300. In the aspect shown, the component 1302 can be a valve, for example and without limitation. A lid 1308 can at least partially enclose the vault 1306 opposite from the bell 2206.

Figure 23:
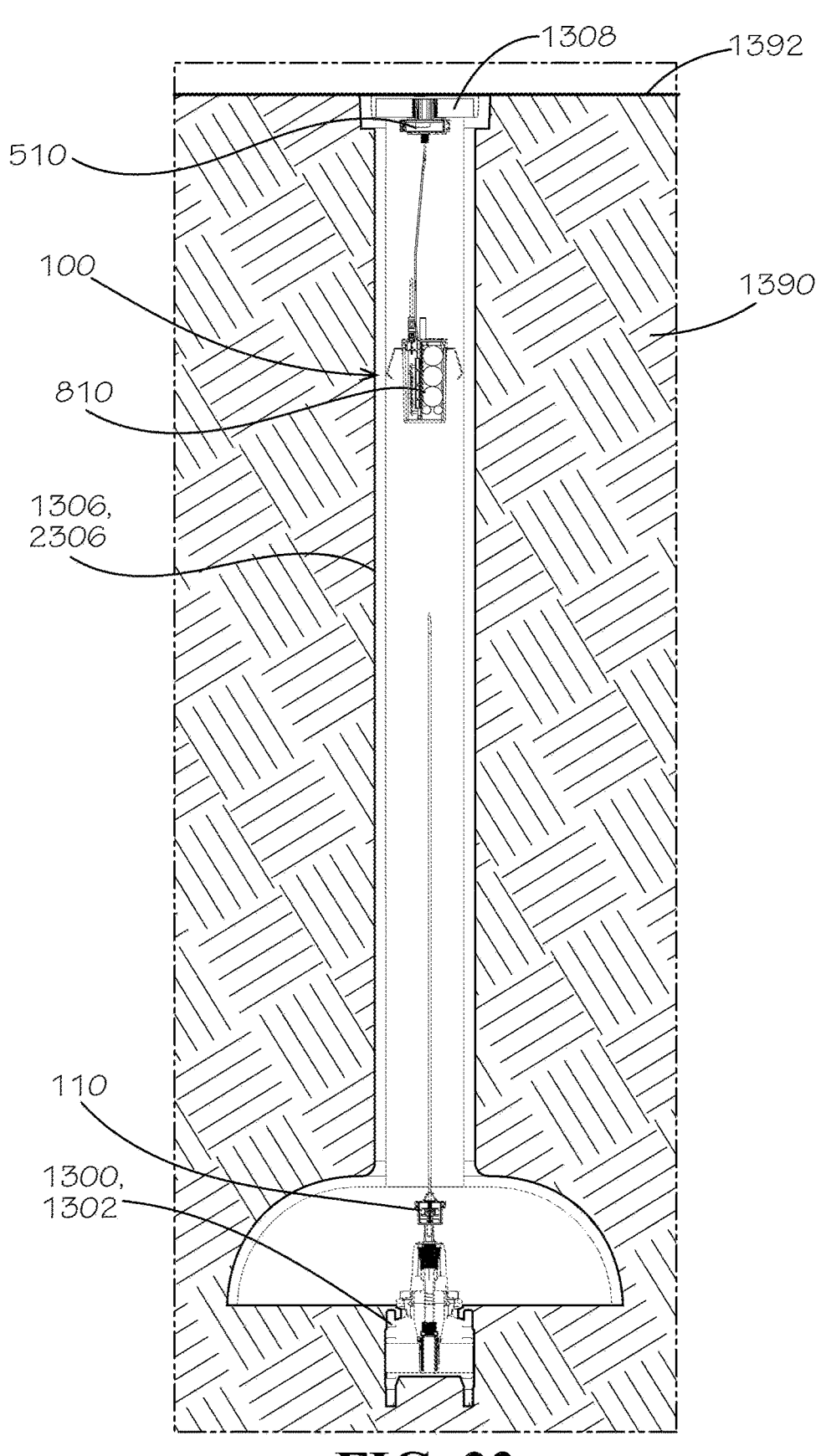
FIG. 23 is a cross-sectional view of the sensor system, the vault, and the pipe network of FIG. 22 taken along line 23-23 shown in FIG. 22.

FIG. 23 is a cross-sectional view of the sensor system 100, the pipe network 1300, and the vault 1306 taken along line 23-23 shown in FIG. 22. The sensor system 100, the pipe network 1300, and the vault 1306 can be installed in the ground 1390 (denoted by the diagonal hashing). The ground 1390 can be comprised of any number of materials, including dirt, concrete, asphalt, sand, clays, loam, rock, or any other natural or man-made substrate, or combinations thereof. The lid 1308 can be positioned approximately flush with a ground surface 1392. In some aspects, the ground surface 1392 can be a roadway, sidewalk, foundation, floor, or other structure.

The sensor system 100 can comprise the sensor module 110 of FIG. 18, the processor module 810 of FIG. 8, and another aspect of an antenna module 510 in accordance with another aspect of the present disclosure. The sensor module 110 can be coupled to the component 1302 of the pipe network 1300. The processor module 810 can be suspended in a tube 2306 of the vault 1306. The antenna module 510 can be secured below the lid 1308. The antenna module 510 and the sensor module 110 can be connected in electrical communication with the processor module 810.

Figure 24:
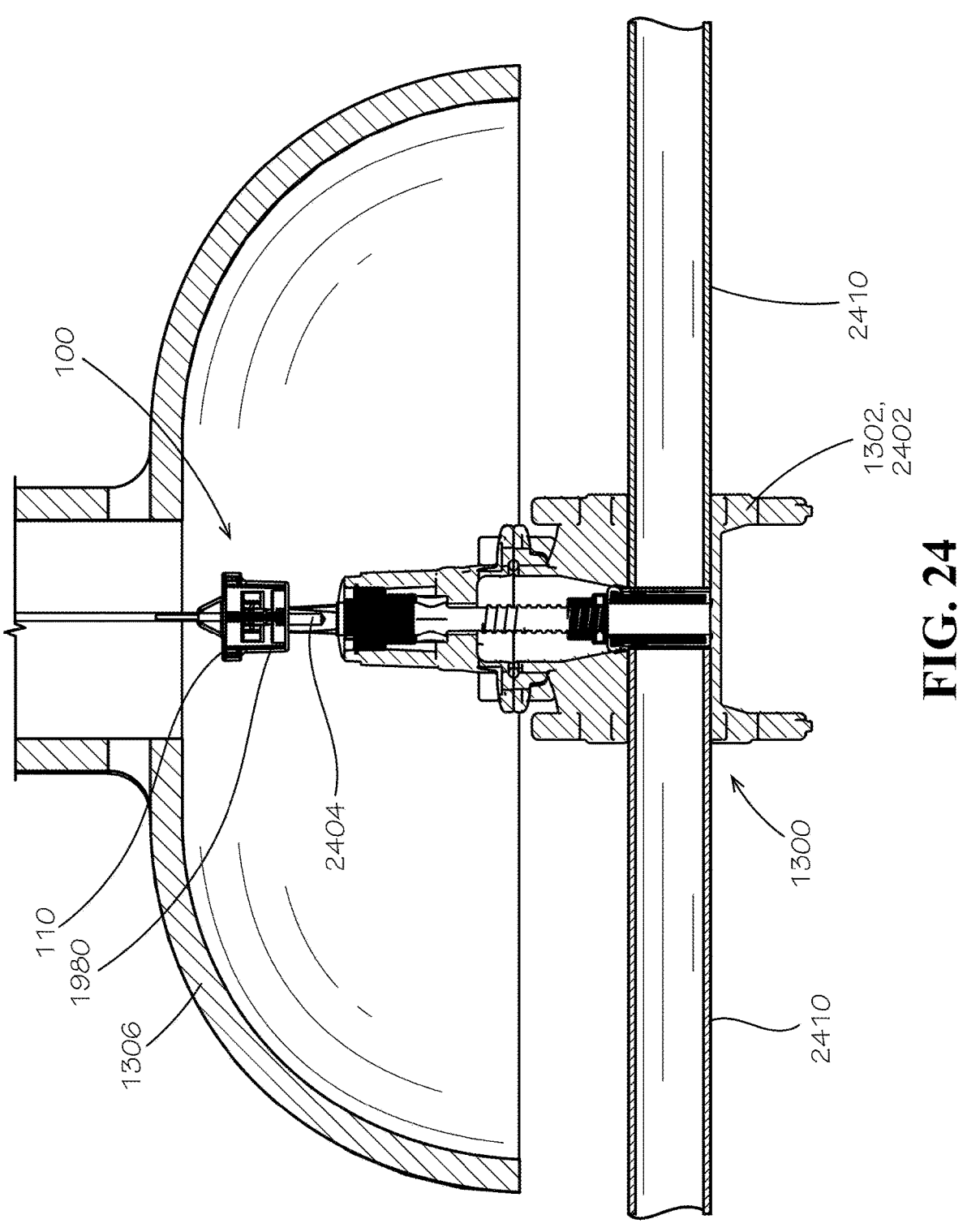
FIG. 24 is a detailed cross-sectional view of the sensor system, the vault, and the pipe network of FIG. 22 taken along line 23-23 shown in FIG. 22.

FIG. 24 is a detailed view of the cross-sectional view of the sensor system 100, the vault 1306, and the pipe network 1300 from FIG. 23, with the hashing denoting the ground 1390 (shown in FIG. 23) omitted. In the present aspect, the component 1302 of the pipe network 1300 can be a valve 2402, such as a gate valve, ball valve, butterfly valve, globe valve, check valve, or any other suitable type of valve. The magnet 1980 can magnetically couple the sensor module 110 to the component 1302. In the aspect shown, the sensor module 110 can be coupled to a valve stem 2404 of the component 1302; however, in other aspects, the sensor module 110 can couple to a different portion of the valve 2402, such as a body or bonnet of the valve 2402 for example and without limitation. Pipes 2410 of the pipe network 1300 can be coupled to the component 1302, and the sensor module 110 can detect vibrations originating within the pipe network 1300 and travelling through the pipes 2410 and component(s) 1302.

In some aspects, the sensor module 110 can be coupled directly to a pipe, such as the pipes 2410. In some aspects, the component 1302 may not be a valve. In some aspects, the component 1302 can be a flow meter, fitting, coupling, strainer, or other piping component.

Figure 25:
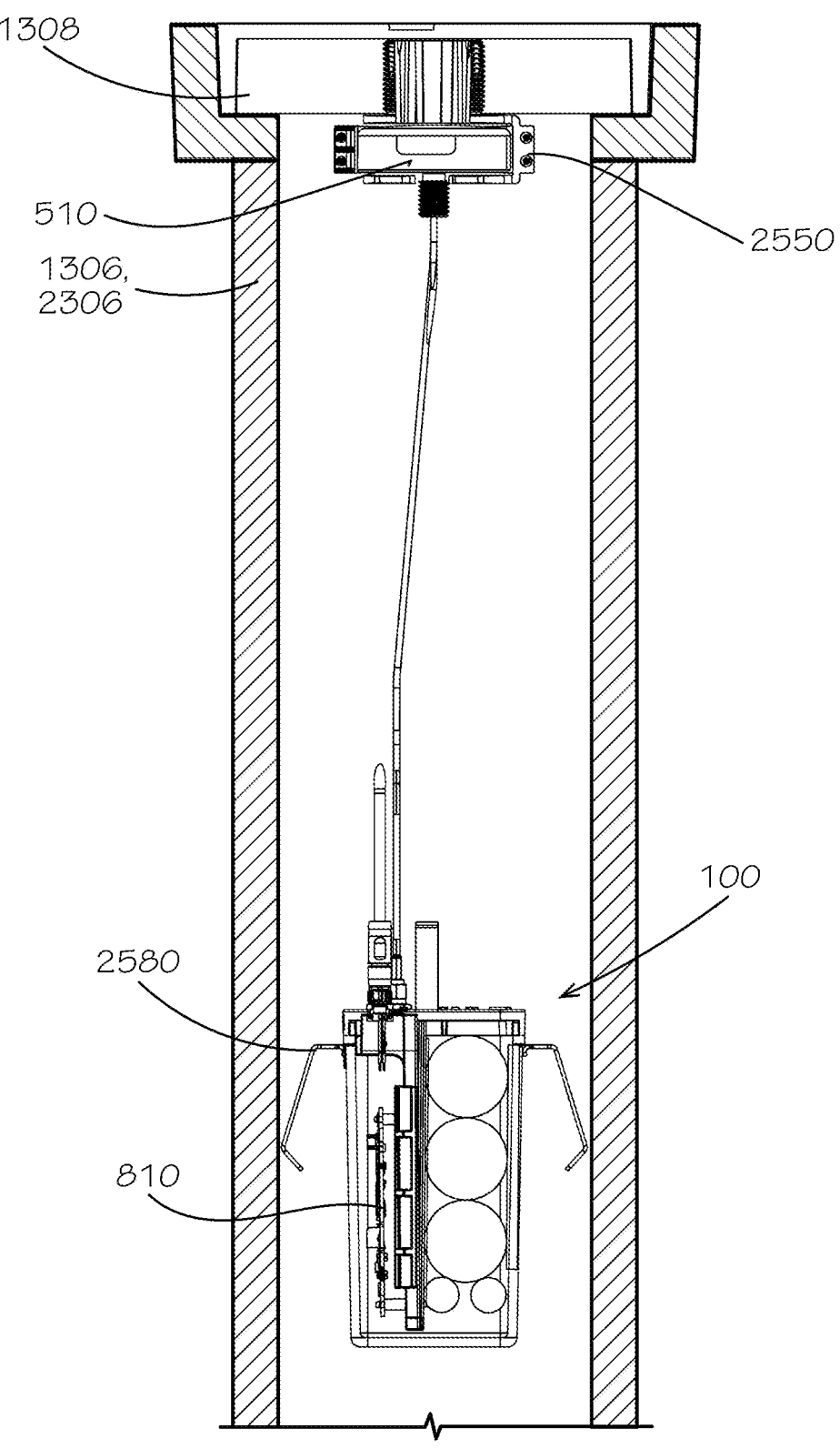
FIG. 25 is a detailed cross-sectional view of the sensor system and the vault of FIG. 22 taken along line 23-23 shown in FIG. 22.

FIG. 25 is another detailed view of the cross-sectional view of the sensor system 100 and the vault 1306 from FIG. 23, with the hashing denoting the ground 1390 (shown in FIG. 23) omitted.

The processor module 810 can be suspended in the tube 2306 of the vault 1306 by a bracket 2580. The antenna module 510 can be coupled to the lid 1308 with an antenna mount 2550.

As noted above, the vault 1306 and the lid 1308 can be installed in environments, such as roadways for example and without limitation, where high structural loads can be imposed on the vault 1306 and the lid 1308. For example, a car or truck tire may rest atop the lid 1308, which can impose a load of thousands of pounds on the lid 1308 and supporting portions of the vault 1306. The vault 1306 and/or the lid 1308 can comprise a high-strength material, such as a metal, polymer, composite, or other suitable material. For example and without limitation, composites such as fiber-reinforced polymers can be utilized. In some aspects, it can be desirable to form the lid 1308 from nonmetallic materials to improve transmission of electromagnetic signals through the lid 1308 and to or from the antenna module 510; however, the antenna module 510 can be utilized with aspects of the lid 1308 comprising metallic materials as well.

Figure 26:
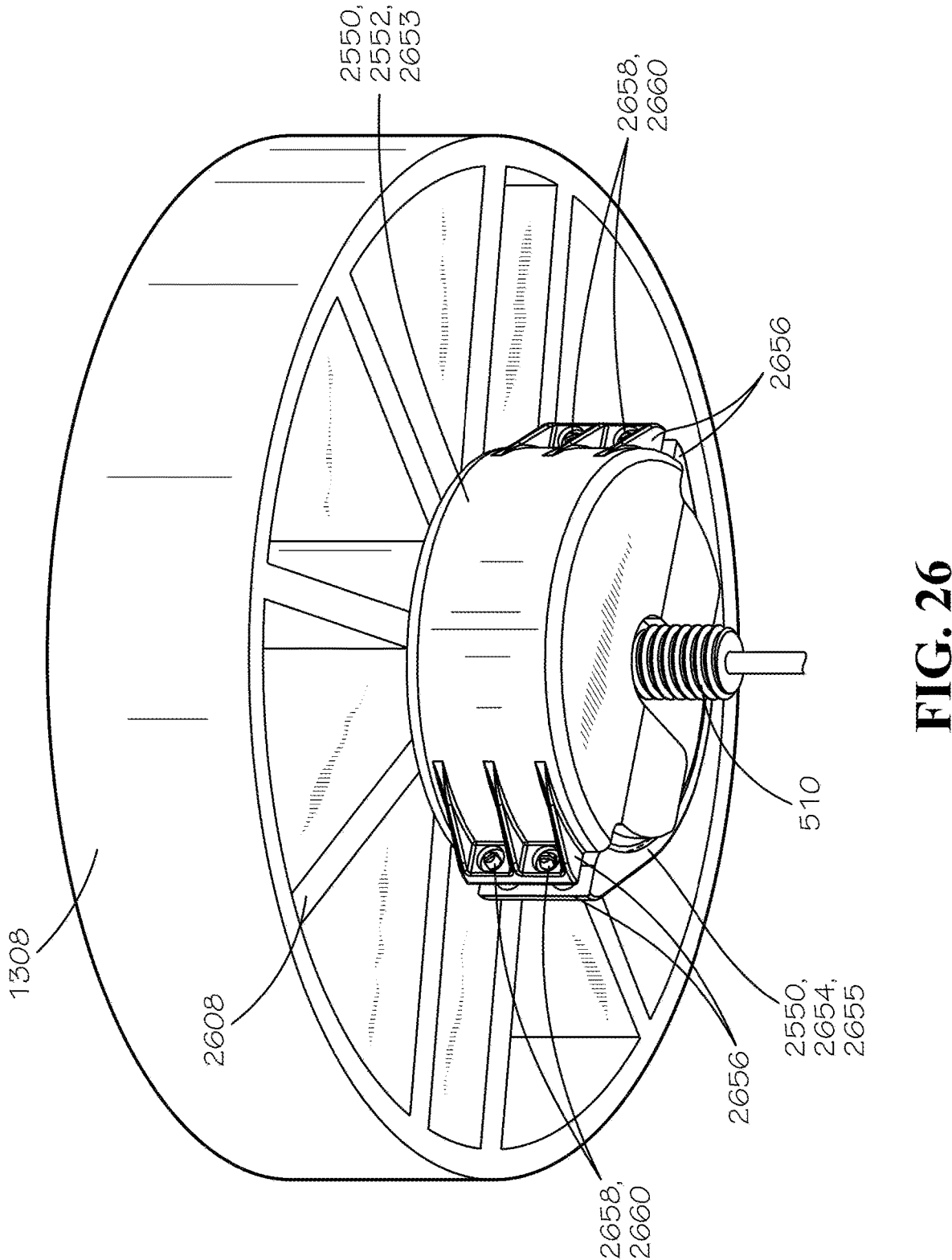
FIG. 26 is a bottom perspective view of a lid of the vault of FIG. 22, an antenna module of the sensor system of FIG. 22, and an antenna mount in accordance with another aspect of the present disclosure.

FIG. 26 is a bottom perspective view of the lid 1308, the antenna module 510, and the antenna mount 2550 from FIG. 25.

The antenna mount 2550 can mount to a bottom 2608 of the lid 1308. The antenna mount 2550 can comprise a first segment 2652 and a second segment 2654. In the present aspect, the first segment 2652 can mount to the lid 1308, and the second segment 2654 can mount to the first segment 2652. In some aspects, the second segment 2654 can mount to the lid 1308 in addition to or in place of attaching to the first segment 2652.

The first segment 2652 and the second segment 2654 can each respectively define an arcuate sidewall 2653,2655, which can together encircle the antenna module 510. The segments 2652,2654 can each define a pair of fastener lugs 2656 at opposing ends of the respective arcuate sidewalls 2653,2655. At each end, the fastener lug 2656 of the first segment 2652 can be secured to the fastener lug 2656 of the second segment 2654 by at least one fastener 2658. In the present aspect, each end can be secured together by two fasteners 2658; however, this should not be viewed as limiting. In other aspects, each end can be secured together by greater or fewer than two fasteners 2658. In some aspects, the fastener lugs 2656 can be rotatably pinned together to from a hinge at one end.

In the present aspect, the at least one fastener 2658 can be a standoff snap 2660. In other aspects, the fasteners 2658 can be a different type of fastener, such as a screw, bolt, stud, rivet, nut, snap ring, pin, or combination thereof.

Figure 27:
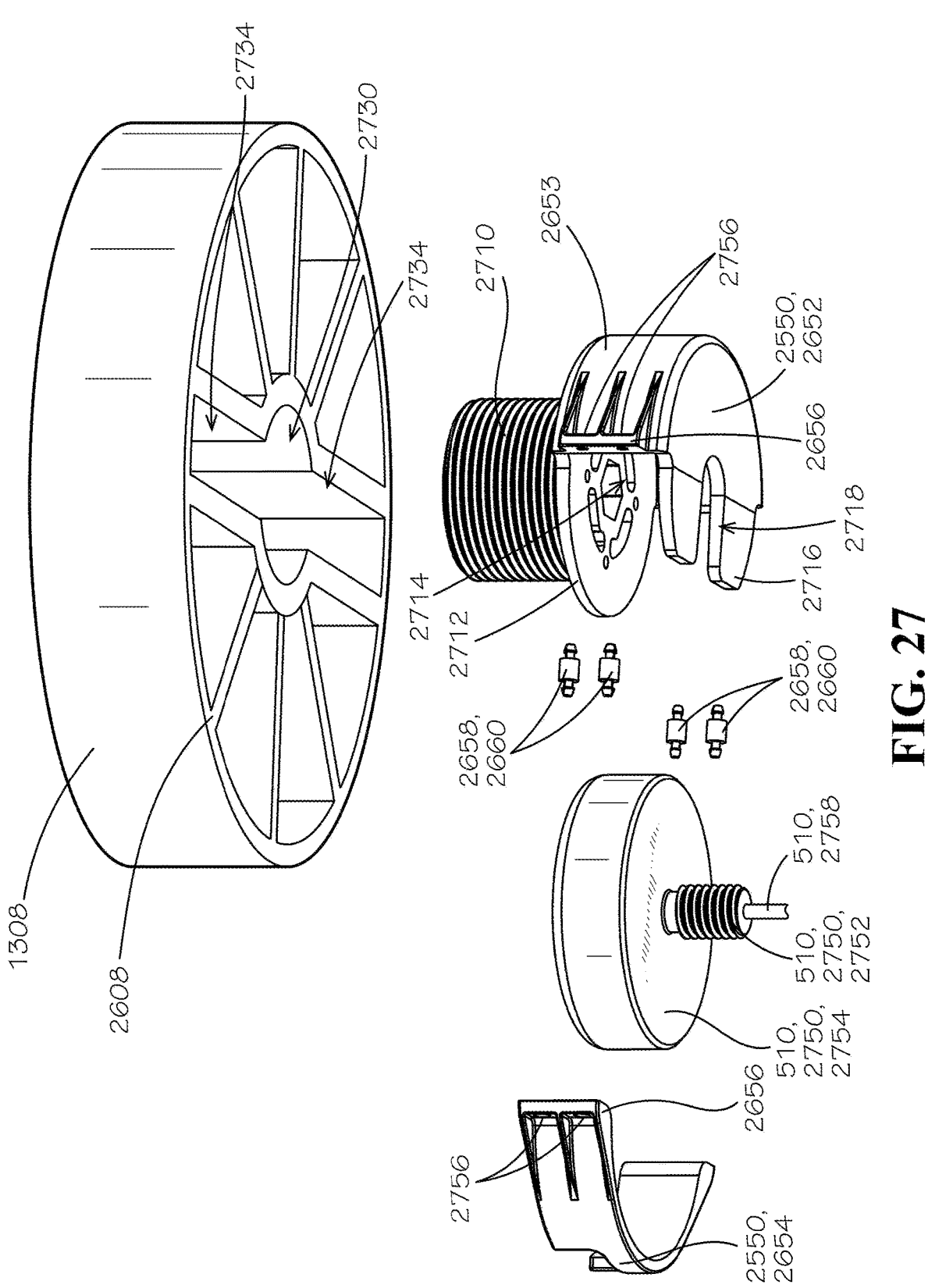
FIG. 27 is an exploded view of the lid, antenna mount, and antenna module of FIG. 26.

FIG. 27 is a bottom perspective view of the lid 1308, the antenna module 510, and the antenna mount 2550 from FIG. 25 shown in an exploded configuration.

The lid 1308 can define a bore 2730 on the bottom 2608. In the present aspect, the lid 1308 can define a pair of channels 2734, which can intersect with the bore 2730 such that the bore 2730 can define circumferential gaps. In some aspects, the bore 2730 can be fully circumferentially enclosed.

A top portion 2712 of the first segment 2652 can define a threaded shaft 2710, which can be threaded into the bore 2730. In some aspects, the bore 2730 can define female threading that is complimentary to the threaded shaft 2710. In some aspects, the threaded shaft 2710 can cut threads into the bore 2730, which can be similar to the manner in which a screw can cut into wood.

The first segment 2652 can define a bottom portion 2716 opposite from the top portion 2712. The arcuate sidewall 2653 can extend between the top portion 2712 and the bottom portion 2716. The top portion 2712, the bottom portion 2716, and the arcuate sidewall 2653 can define a recess 2714. The bottom portion 2716 of the first segment 2652 can define a notch 2718, which can be in communication with the recess 2714.

The antenna module 510 can comprise an enclosure 2750 and a cable 2758 extending downwards from the enclosure 2750. The enclosure 2750 can comprise materials selected to minimize interference to signals transmitted and/or received by the antenna module 510. For example and without limitation, the antenna module 510 can be configured to communicate via the transmission and/or reception of electromagnetic waves. The enclosure 2750 can comprise materials, such as nonmetallic materials, which can minimize interference with the antenna module 510. For example and without limitation, the enclosure 2750 can comprise a polymer, composite, or any other suitable material. However, in some aspects, the enclosure 2750 can comprise metallic materials.

The enclosure 2750 can define a main portion 2754 and a threaded shaft 2752 extending downwards from the main portion 2754. The cable 2758 can extend outwards through the threaded shaft 2752. The main portion 2754 can define a cylindrical shape in the present aspect, though the shape should not be viewed as limiting. The recess 2714 can be sized and shaped to receive the main portion 2754. When the main portion 2754 is cradled by the first segment 2652, the threaded shaft 2752 and the cable 2758 can extend downwards through the notch 2718.

The antenna module 510 can be secured within the antenna mount 2550 by securing the second segment 2654 to the first segment 2652 while the main portion 2754 of the antenna module 510 is positioned within the recess 2714. The second segment 2654 can be secured to the first segment 2652 by engaging the fastener lugs 2656 with the fasteners 2658. Each of the fastener lugs 2656 can define at least one fastener hole 2756. The fasteners 2658 can be inserted through the fastener holes 2756 to secure the fastener lugs 2656 of the first segment 2652 to the fastener lugs 2656 of the second segment 2654.

The standoff snaps 2660 of the present aspects can have retention mechanisms at opposite ends. In the present aspect, each end can define a barbed slit shaft, which can snap through one of the fastener holes 2756 to secure the standoff snap 2660 to one of the fastener lugs 2756. In some aspects, the fasteners 2658 can define a different retention mechanism, such as one that relies upon friction, interference, or engagement for example and without limitation. In some aspects, the retention mechanisms can defined ribs, teeth, barbs, or other structures or surfaces to engage with the fastener lugs 2656.

In some aspects, some or all of the fasteners 2658 can be integrated with the first segment 2652, the second segment 2654, or some combination thereof. For example and without limitation, in some aspects, one or more of the fastener lugs 2656 can integrally define a fastener structure, such as a snap, threaded post, threaded bore, pin, or other suitable structure which can couple with an opposing fastener lug 2656, either alone or in conjunction with another fastener component.

One should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described aspect(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A sensor system comprising:
   a sensor module comprising a vibration sensor;
   a processor module comprising a power supply and a processor PCB, the processor module connected in electrical communication with the sensor module by a first cable; and
   an antenna module comprising an antenna, the antenna module connected in electrical communication with the processor module by a second cable;
   wherein:
       the sensor module further comprises a sensor enclosure shell and a fastener;
       the vibration sensor is positioned within a sensor cavity defined by the sensor enclosure shell;
       the fastener extends through the sensor enclosure shell; and
       the vibration sensor is mounted to the fastener.

2. The sensor system of claim 1, wherein:
   the processor module further comprises a processor enclosure;
   the processor enclosure comprises a container shell and an insert; and
   the processor PCB is secured to the insert.

3. The sensor system of claim 1, wherein:
   the sensor module further comprises a magnet.

4. The sensor system of claim 3, wherein the magnet is positioned within the sensor cavity.

5. The sensor system of claim 4, wherein:
   the vibration sensor defines a threaded portion;
   the threaded portion extends through the magnet and is coupled to the sensor enclosure shell; and
   the vibration sensor secures the magnet to the sensor enclosure shell.

6. The sensor system of claim 3, wherein the magnet is secured to the fastener.

7. The sensor system of claim 1, wherein the sensor module, the antenna module, and the processor module are each hermetically sealed.

8. The sensor system of claim 1, further comprising a vault with a lid, the vault defining a vault cavity, the lid at least partially enclosing the vault cavity, the antenna module positioned within the vault cavity and secured to the lid by an antenna mount.

9. The sensor system of claim 1, further comprising a vault buried at least partially beneath a ground surface, the vault defining a vault cavity, the processing module positioned within the vault cavity, the antenna module positioned within a hole extending into the ground surface, at least one cable connecting the antenna module in electrical communication with the processing module.

\* \* \* \* \*